(12) United States Patent
Banks et al.

(10) Patent No.: US 12,472,426 B1
(45) Date of Patent: Nov. 18, 2025

(54) HUB FOR CONVERTING INPUT FROM CONTROL DEVICES

(71) Applicant: Amazon Technologies, Inc., Seattle, WA (US)

(72) Inventors: Dave Banks, Lake Forest, CA (US); Junjie Lin, Mission Viejo, CA (US); Lunci Hua, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 399 days.

(21) Appl. No.: 18/080,647

(22) Filed: Dec. 13, 2022

(51) Int. Cl.
  *A63F 13/23* (2014.01)
  *A63F 13/22* (2014.01)
  *A63F 13/35* (2014.01)
  *H04L 67/131* (2022.01)

(52) U.S. Cl.
  CPC ............. *A63F 13/23* (2014.09); *A63F 13/22* (2014.09); *A63F 13/35* (2014.09); *H04L 67/131* (2022.05); *A63F 2300/1025* (2013.01)

(58) Field of Classification Search
  CPC ......... A63F 13/235; A63F 13/22; A63F 13/23
  See application file for complete search history.

(56) References Cited

U.S. PATENT DOCUMENTS

| | | | | |
|---|---|---|---|---|
| 5,896,125 A | * | 4/1999 | Niedzwiecki | A63F 13/22 463/36 |
| 10,912,991 B2 | * | 2/2021 | Buhr | A63F 13/23 |
| 2013/0154958 A1 | * | 6/2013 | Clavin | G06F 1/1632 345/173 |
| 2018/0199176 A1 | * | 7/2018 | Srivatsa | H04M 1/72412 |
| 2020/0147481 A1 | * | 5/2020 | Soelberg | A63F 13/211 |
| 2020/0306625 A1 | * | 10/2020 | Palmer | H04W 76/00 |
| 2023/0077732 A1 | * | 3/2023 | Nuth | A63F 13/26 463/31 |
| 2023/0085053 A1 | * | 3/2023 | Young | A63F 13/24 463/4 |
| 2023/0090035 A1 | * | 3/2023 | Lea | H04W 76/15 370/329 |
| 2023/0091057 A1 | * | 3/2023 | Lea | A63F 13/235 370/329 |

* cited by examiner

*Primary Examiner* — Jay Trent Liddle
(74) *Attorney, Agent, or Firm* — Kilpatrick Townsend & Stockton LLP

(57) ABSTRACT

This disclosure describes, in part, a system and method for receiving inputs from control devices of different types, sources, and origins at a mobile device to control a single unified platform in parallel with control devices intended for control of the platform. The system and method include connecting a control device to a mobile device that may communicate, over a network, with a remote system to enable a third-party or non-network-connected control device to be used alongside and/or in place of a network-connectable control device.

20 Claims, 11 Drawing Sheets

HUB FOR CONVERTING INPUT FROM CONTROL DEVICES

BACKGROUND

As gaming has become popular, companies have created electronic devices, such as video game consoles, that allow users to play various types of games. For example, a video game console, connected to a television, may cause the television to display content related to a state of a game. While the television is displaying the content, the video game console may receive inputs directly from a video game controller in possession of a user. The video game console may then process the inputs in order to update the state of the game. Based on the updates, the video game console may cause the television to display content related to the updated state of the game.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
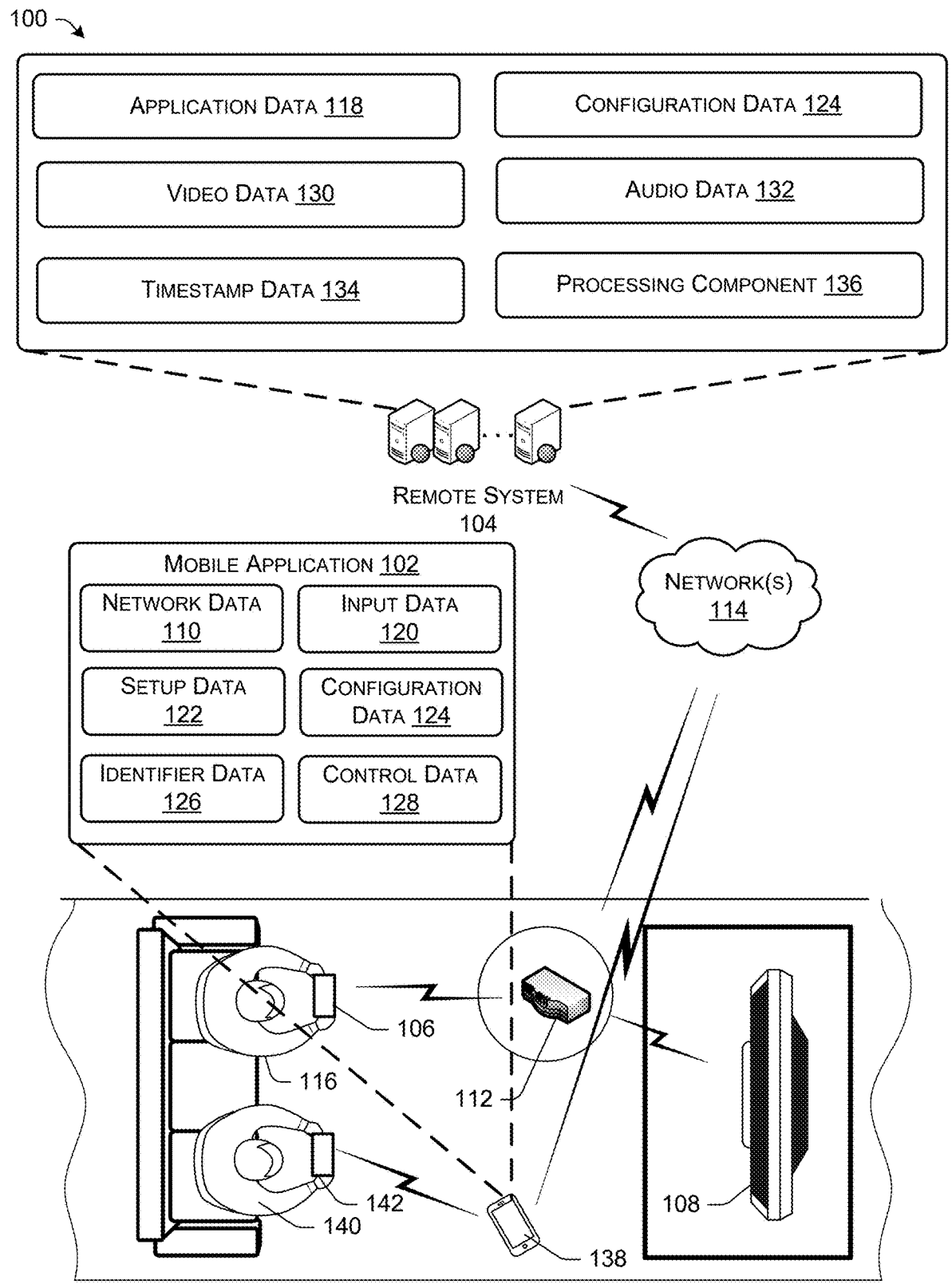
FIG. 1 illustrates a schematic diagram of an example system for controlling network applications using various control devices, according to various aspects of the present disclosure.

This disclosure describes, in part, an electronic device for receiving inputs from various control devices at a mobile device for routing to a network application on a server enabling control using the various control devices that may not have network-connectable components or functionality, and thereby expand a range of usable control devices for the network application through the use of the mobile device hub. For instance, a user may control an application executing on a remote system using a control device that communicates with a remote system via a network connection using communication hardware, e.g., a Wi-Fi chip, or other such components within the control device rather than through a console or other physical hardware. In some examples, the user may wish to use a control device other than one provided with the system based on their preferences. For instance, the user may wish to interact with a network-based game using a game controller other than the game controller provided for the system. The systems and techniques herein provide for connecting a variety of control devices from different platforms, types, origins, and manufacturers to be used with such a network-based system.

Using the systems and techniques herein, a user may interact with a network-based application that may have originally been intended for use with specific controllers including communication components (e.g., Wi-Fi capability or other network capability) not typically part of such controllers. The user may select their preferred control device and connect through a mobile device (e.g., a smartphone) through a wired or wireless connection to then connect to the network application while also enabling use of the third-party control device. For instance, the control device may send data to the remote system, where the data represents at least inputs received by the control device. The remote system may then update a current state of the network application using the data received from the control device. Additionally, the remote system may send, via the network connection, video data to a display device, where the video data represents the current state of the network application. As such, and in some instances, an additional electronic device, such as a video game console, may not be required to execute the network application and/or process the data from the control device. In such examples, this may remove the need of the additional electronic device. The mobile device may host a mobile application that performs some or all of the processes described herein.

In some instances, the user may want to use different types of control devices to control the network application. For example, if the network application includes a gaming application, the control devices may include, but are not limited to, an XBOX® game controller, a PLAYSTATION® game controller, a NINTENDO® game controller, and/or any other type of game controller. However, since the different types of game controllers may include different types of input devices, one or more of the game controllers may not be compatible and/or configured for the gaming application. This may cause it so that the user is not able to use one or more of the game controllers with the network game.

As such, the application describes an electronic device that is able to configure different types of control devices so that the control devices are compatible for network applications. For example, the user may connect the mobile device to a control device. In some instances, the electronic device includes a wired connector, such as a Universal Serial Bus (USB), cable, and/or other types of connector, that the electronic device uses to establish a wired connection with the control device. Additionally, or alternatively, in some instances, the mobile device includes a network interface that the electronic device uses to establish a wireless connection with the control device. The wireless connection may include, but is not limited to, a Bluetooth connection, a Zigbee connection, and/or any other type of wireless connection.

The electronic device may also establish a connection with a mobile device, such as a smartphone, that has network-connective capability. In some instances, the mobile device may be connected to the control device using a wired connector, such a USB, cable, and/or other types of connector, that the mobile device uses to establish a wired connection with the network device, e.g., server, hosting the network application. Additionally, or alternatively, in some instances, the mobile device includes a network interface that the mobile device uses to establish a wireless connection (e.g., Internet connection) with the server. In either instance, the mobile device may use network data representing configuration settings, such as a Service Set Identifier (SSID) and password, to establish the connection with the server.

In some instances, such as when the mobile device has yet to be configured, the mobile device may receive the network data representing the configuration settings through a mobile application. For example, the user may use the control device and/or another device to input the configuration settings. The mobile device may then use the configuration settings to establish the connection with the server. In other instances, such as when the mobile application has previously been configured, the mobile application may already store the network data representing the configuration settings. As such, the mobile device may use the configuration settings to establish the connection with the server.

The mobile device may then be configured for the control device and/or the server. For example, the control device may be configured for use with multiple network applications. For instance, the mobile device may receive, from the remote system, data representing general controls that are applicable to more than one network application. For example, a first control may be associated with a joystick, a second control may be associated with a first type of button (e.g., the "X-button"), a third control may be associated with a second type of button (e.g., the "Y-button"), and/or the like. The control device, the mobile device, and/or the display device may then request that the user associate input devices of the control device with the various general controls.

For example, the display device may present content associated with a first control, such as "left joystick". The control device may then receive an input selecting a first input device and send data representing the input to the electronic device. The mobile device may then associate the selected input device (e.g., the first input device) with the first control (e.g., the left joystick). For another example, the display device may present content associated with a second control, such as the "X-button". The control device may then receive an input selecting a second input device and send data representing the input to the mobile device. The mobile device may then associate the selected input device (e.g., the second input device) with the second control (e.g., the X-button). This process may then be repeated for the other general controls. In some instances, once the user is finished, the mobile device, mobile application, and/or another device, may store data (e.g., configuration data) representing the associations. In some instances, the mobile device may further associate the configuration data with data (e.g., identifier data) associated with the control device.

When associating the input devices with the various general controls, the general controls may be associated with a specific type of control device that is configured for use with the network applications. For example, a corporation, business, manufacturer, and/or the like may manufacture the specific type of control device that is to be used for controlling the network applications. For instance, the specific type of control device may include input devices that are necessary for controlling the network applications. However, other types of control device may not include the same input devices. As such, initially, the system may be unable to use the inputs from the other types of control devices when updating the states of the network applications.

As such, the mobile device provides the other types of control devices with the ability to be used for controlling the network applications by associating the input devices of the other types of control devices with the input devices of the specific type of control device. For example, the specific type of control device may include three buttons, such as an X-button, a Y-button, and a Z-button. Another type of control device may include five buttons, such as an A-button, a B-button, a C-button, a D-button, and an E-button. In order to control a network application, the system may be required to receive inputs that are associated with the X-button, the Y-button, and the Z-button. As such, the user may configure the mobile device such that the A-button of the other type of control device is associated with the X-button, the B button of the other type of control device is associated with the Y-button, and the C-button of the other type of control device is associated with the Z-button.

Additionally, to, or alternatively from, associating the control device with general control for network applications, the mobile device may configure the control device for a specific network application. For instance, the network application may include various controls that are necessary for controlling the network application. For example, if the network application includes a gaming application where a character is controlled by the user, the controls may include a first control to move the character forward, a second control to move the character backwards, a third control to cause the character to jump, a fourth control to cause the character to pick up items, and/or any other type of control. As such, the mobile device may be configured in order to associate (e.g., map) the input devices of the control device with the controls of the network application.

In some instances, to configure the control device with the network application, the mobile device may receive, from a remote system, data representing the various controls for the network application. The control device, the mobile device, and/or the display device may then request that the user associate input devices with the various controls. For example, the display device may present content associated with a control, such as jump. The control device may then receive an input selecting an input device and send data representing the input to the mobile device. The mobile device may then associate the selected input device with the control of the network application. This process may then be repeated for the other controls of the network application. In some instances, once the user is finished, the mobile device (and/or another device or application) may store data (e.g., configuration data) representing the associations. In some instances, the mobile device may further associate the configuration data with data (e.g., identifier data) associated with the control device.

After configuring the mobile device, the mobile device may use the configuration data (e.g., the network application specific configuration data, the general configuration data, etc.) for the network application. For instance, as the control device is receiving inputs using the input devices, the mobile device may receive data (e.g., input data) representing the inputs. The mobile device may then use the configuration data to determine which controls are being selected by the user. For instance, if the configuration data associates a first input device (e.g., the A-button) with a first control (e.g., the X-button), and the input data represents a selection of the first input device, then the mobile device may use the configuration data to determine the first control. The mobile device may then send data (e.g., control data) representing the first control (e.g., the selection of the X-button) to the remote system. Additionally, the mobile device may repeat this process as the electronic device continues to receive the input data. In some examples, the network device hosting the network application may store and use the configuration data as described herein.

In some instances, the mobile device may perform similar processes for configuring the mobile device with other network applications and/or control devices. Additionally, for each configuration, the mobile device may store the configuration data, which the mobile device may use the next time the user is playing the network application using the control device.

For example, after previously configuring a control device with a control device and/or network application, the user may connect the mobile device to the control device. The mobile device may then receive, from the control device, data (e.g., identifier data) representing the control device. Using the identifier data, the mobile device may identify the control device. Additionally, the mobile device may receive, from the remote system, data (e.g., application data) representing a network application being executed by the remote system. Using the network application data, the mobile device may identify the network application. The mobile device may then identify configuration data for the control device using the identity of the control device and/or the network application data. For instance, the mobile device may identify that the configuration data is associated with the control device and/or the network application. Additionally, the mobile device may use the configuration data for converting the inputs received by the control device.

In some instances, when a client device (e.g., control device or other such device) is launched, the mobile device may connect to the client device automatically. The control device may be moved between different clients using the mobile device, for example to move the control device between multiple different video game clients. The control device may therefore be connected and moved between network applications without the need for a pairing process as the mobile device is used to send the input data to the network application over a network connected to the mobile device.

Although the above example describes the mobile device as storing the configuration data, in other examples, another device may store the configuration data. For example, the remote system may store the configuration data. The remote system may then receive the identifier data from the electronic device and identify the configuration data using the identifier data. After identifying the configuration data, the remote system may send the configuration data to the electronic device. Again, the electronic device may use the configuration data for converting the inputs received by the control device.

In some instances, the mobile device may further receive data from the remote system and send the data to the control device. For example, the mobile device may receive audio data representing sound associated with a state of the network application. The mobile device may then send the audio data to the control device, which may use the audio data to output the sound. In some instances, the mobile device may receive timestamp data representing a timestamp indicating when to output the sound. In such instances, the mobile device may further send the timestamp data to the control device so that the control device can use the timestamp data when outputting the sound.

As described herein, the remote system may provide the user with network applications which are controlled by various control devices. For example, the remote system may further store data representing one or more network applications that are accessible by the control devices via a network. An application can include, but is not limited to, a gaming application, a word processing application, an educational application, a multimedia application (e.g., movie, music, etc.), and/or any other type of application that is capable of being accessed via the network. The remote system may associate one or more of the network applications with a user profile. For instance, the remote system may receive data indicating that the user has acquired (e.g., purchased, leased, etc.) an application from the remote system. In some instances, the remote system may then store, in the user profile, data indicating that the user acquired by the network application.

To access an application, a control device may connect to the mobile device, which may then connect to the network using the network data. The control device and/or the mobile device may then send, to the remote system, data representing at least the identifier associated with the control device and/or the mobile device. The remote system may receive the data and determine, using the user profile, that the data is received from the control device and/or the mobile device. The remote system may further determine, using the user profile, that the control device and/or the mobile device is associated with at least a display device. In some instances, the remote system may then send, to the display device, data (e.g., video data, audio data, etc.) representing the one or more applications acquired by the user. In some instances, the remote system may send, to the display device, data (e.g., video data, audio data, etc.) representing one or more additional applications that are accessible for the user. In either example, the display device may receive the data and display content that identifies the one or more applications. For instance, the content may include a respective identifier (e.g., a name) of each of the one or more applications that are accessible to the user.

The remote system may then receive, from the mobile device, data (e.g., input data) representing a selection of a network application. Based at least in part on the data, the remote system may begin executing data (e.g., computer code) representing the network application. The remote system may then begin receiving, from the mobile device, data representing inputs received by the control device. In some instances, the mobile device sends the data each time the control device receives an input. In some instances, the mobile device sends the data at given time intervals (e.g., every millisecond, ten milliseconds, second, etc.). In either instance, the remote system uses the data to update the state of the network application based on the input(s) being received by the control device. The remote system may then send data representing the states of the network application to the display device.

For instance, the remote system may send, to the display device, data (e.g., video data, audio data, etc.) representing a first state of the network application. For example, if the network application includes a gaming application, the first state of the network application may include an object (e.g., a character) located at a first position within a gaming environment (e.g., a forest). The display device may receive the data from the remote system. Using the data, the display device may display image(s) representing the first state of the network application. For example, and again if the network application includes the gaming application, the display device may display content representing the object located at the first position within the gaming environment. In some instances, the display device may further output sound represented by the audio data. The user may then use the control device to provide inputs to the network application via the remote system.

For instance, the control device may receive an input, such as a selection of an input device. The mobile device may then send, to the remote system, data representing the input and/or the control associated with the network application. Using the data, the remote system may update the first state of the network application to a second state of the network application. For example, and again if the network application includes the gaming application, the input may be associated with moving the object forward by a given amount within the gaming environment. As such, the remote system may update the first state of the of the network application to the second state of the network application by moving the object forward in the environment by the given amount.

The remote system may then send, to the display device, data (e.g., video data, audio data, etc.) representing the second state of the network application. The display device may display image(s) representing the second state of the game. For example, the display device may display content representing the object located at the second position within the gaming environment. Additionally, in some instances, the display device may further output sound represented by the audio data. The remote system may then continue to perform similar processes to update the state of the network application on the display device as the remote system continues to receive data from the control device.

In some instances, the remote system may further send data (e.g., video data, audio data, etc.) to the mobile device, where the data is associated with the state of the network application being displayed by the display device. For example, the remote system may send, to the mobile device, audio data that represents sound corresponding to a current state of the network application being displayed by the display device. The mobile device may send the audio data to the control device, which may then output the sound. In some instances, when sending audio data to the electronic device, the remote system, the control device, and/or another device may synchronize the output of the audio data with the current state of the network application.

For a first example, the remote system may generate first timestamp data representing a first timestamp associated with the data being sent to the display device and/or second timestamp data representing a second timestamp associated with the audio data being sent to the control device. The remote system may then send the first timestamp data to the display device and the second timestamp data to the mobile device. In some instances, the remote system sends the first timestamp data as part of a first data packet to the display device, where the first data packet further includes the video data. In other instances, the remote system sends the first timestamp data to the display device separately from the video data. Additionally, in some instances, the remote system sends the second timestamp data as part of a second data packet to the electronic device, where the second data packet further includes the audio data. In other instances, the remote system sends the second timestamp data to the mobile device separately from the audio data.

The second timestamp data may be used by the control device to synchronize the output of the audio data with the displaying of the current state of the network application by the display device. For instance, the first timestamp data may include a first instruction to display the current state of the network application at a first time and the second timestamp data may include a second instruction to output the sound at a second time, where the first time is similar to (e.g., the same as, with a threshold period of time to, etc.) the second time. As such, the control device may store the audio data and/or the second timestamp data in a buffer. The control device may then determine when a current time includes the second time represented by the second timestamp data. When the current time includes the second time, the control device may output the sound represented by the audio data.

In some instances, such as when the network application includes a gaming application, the remote system may perform similar processes and/or techniques as a video game console, a computing device, a tablet, and/or other electronic device to process the data received by the mobile device. However, unlike a traditional video game console, computing device, table, and/or other electronic device that is executing a gaming application, the remote system may be remote from the control device and/or the display device. For instance, the control device and/or the display device may be located in a user's environment, such as the user's home, apartment, office, and/or the like. The remote system may be remote from the user's environment and communicate with each of the control device and the display device via the network.

In some instances, the mobile device may be associated with multiple types of control devices. For example, the mobile device may be configured to generate and/or receive configuration data associated with different types of control devices. In some instances, the mobile device may generate and/or receive data from multiple control devices at a single time, with each uniquely identified by a unique identifier and conveyed, with the unique identifier, from the mobile device to the remote system.

In the above examples, the remote system may be located remotely from the control device and the display device. For example, the control device and the display device may be located in an environment, such as a user's home, apartment, business, and/or the like. The remote system may then be located remotely from the environment, such as a cloud-based system. In other instances, the remote system may be located in the same environment as the control device and/or the display device. For instance, the remote system may include a device that is located within the environment.

Although the above examples describe network applications being executed by the remote system, in other examples, the mobile device may perform similar processes for applications (e.g., games) being executed by a local device, such as a video game console. For example, if the user is using a first gaming controller that is associated with a first game console to play a game being executed by a second game console, then the mobile device may associate the input devices of the first gaming controller with the controls of the game. The mobile device may then receive the input data from the first gaming controller and send the data representing the controls to the second video game console. This way, the mobile device causes the first game controller to be compatible with second video game console.

In an example, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for interacting with a network game. The system includes a server hosting a network game. The system also includes a gaming controller that may include at least one of a wireless connection or a wired connection. The system further includes a mobile device that has an interface for establishing a connection with the gaming controller through the wireless connection or the wired connection, one or more network interfaces, one or more processors, and one or more computer-readable media storing instructions that, when executed by the one or more processors, cause the one or more processors to perform various operations. The operations may include establishing, using the one or more network interfaces, a second connection with the server; receiving, using the interface, first input data representing a selection of a first input device of the gaming controller; based at least in part on receiving the first input data, associating the first input device with a first control of the network game; and sending, using the one or more network interfaces and over the second connection, control data representing an indication that the first control was selected.

Implementations may include one or more of the following features. The operations may include storing an identifier associated with the gaming controller, and the control data may include the identifier. The system may include a second gaming controller, the second gaming controller including a communication element configured to communicate with the server over a network device separate from the mobile device. The system may include a second gaming controller that has at least one of a second wireless connection or a second wired connection to communicate with the mobile device, and the operations may include: receiving, using the interface, second input data representing a second selection of a second input device of the second gaming controller; based on receiving the second input data, associating the second input device with a second control of the network game; and sending, using the one or more network interfaces and over the connection, second control data representing an indication that the second control was selected. Implementations of the described techniques may include hardware, a method or process, or computer software on a computer-accessible medium.

Another general aspect includes a method for interacting with a network application using a variety of control devices. The method includes establishing, using a first network interface, a first connection from a mobile device to a control device. The method also includes establishing, using a second network interface, a second connection from the mobile device to one or more computing devices. The method further includes receiving, using the first connection, first data representing a selection of an input device of the control device and determining that the input device is associated with a control of a network application. The method also includes sending, using the second connection, second data to the one or more computing devices, the second data representing an indication that the control was selected. Other embodiments of this aspect include corresponding computer systems, apparatus, and computer programs recorded on one or more computer storage devices, each configured to perform the actions of the methods.

Implementations may include one or more of the following features. The method as recited may further include receiving, using the second connection, third data associated with configuring the control of the network application; receiving, using the first connection, fourth data representing an additional selection of the input device; and generating fifth data that associates the input device with the control, and determining that the input device is associated with the control may be based at least in part on the fifth data. The method as recited may also include receiving sixth data representing an identifier associated with the control device; and associating the fifth data with the identifier of the control device. The method as recited may additionally include: establishing, using a third network interface, a third connection from a second control device to one or more computing devices, the second control device configured to communicate with the one or more computing devices through a network device separate from the mobile device; and receiving, using the third connection, third data representing a second selection of a second input device of the second control device; determining that the input device is associated with a control of a network application; and sending, using the third connection, third data to the one or more computing devices, the third data representing a second indication that a second control of the second control device was selected. Determining that the input device is associated with the control may be based at least in part on the third data. Determining that the input device is associated with the control may be based on the third data. The control device may be a first type of control device, and the method may further include: establishing, using the first network interface, a third connection with an additional control device, where the additional control device is a second type of control device; receiving, using the third connection, third data representing an additional selection of an additional input device of the additional control device; determining that the additional input device is associated with the control of the network application; and sending, using the second connection, fourth data to the one or more computing devices, the fourth data representing an indication that the control was selected. The mobile device may include a smartphone, and the method further may include receiving a selection, via an input device of the smartphone, of the control device or the additional control device; and controlling the network application based at least in part on the selection. The method as recited may also include determining that an electronic device associated with the network application is powered on; and causing, in response to the electronic device being powered on, the control device to associate with the electronic device. The control device may include a third-party control device, the third-party control device not associated with control of the network application prior to establishing the first connection. Implementations of the described techniques may include hardware, a method or process, or computer software on a computer-accessible medium.

FIG. 1 illustrates a schematic diagram of an example system 100 for controlling network applications using control device 106 as well as through a second control device 142 connected to a mobile device 138. The system 100 may include, for example, a remote system 104, a control device 106, a display device 108, the second control device 142, and the mobile device 138. In some instances, the mobile device 138 and/or the control device 142 includes a wired connector, such as a USB, cable, and/or other types of connector, that the mobile device 138 uses to establish a wired connection with the control device 142. Additionally, or alternatively, in some instances, the mobile device 138 includes a network interface that the mobile device 138 uses to establish a wireless connection with the control device 142.

The mobile device 138 may communicate through a network 114, such as a cellular network and/or the internet to communicate between the control device 142 and the remote system 104. The mobile device 138 may further use network data 110 to establish a connection with the remote system 104. The control device 106 may include a communication device and be capable of communicating with a network device 112, such as an access point. Using the connection, the electronic device 102 may communicate with the remote system 104 over a network(s) 114, such as by using a communication channel. For instance, the electronic device 102 may send data to the remote system 104 and the remote system 104 may send data to the electronic device 102.

Additionally, the display device 108 may communicate with the remote system 104 over the network(s) 114, such as by using a communication channel. For instance, the display device 108 may send data to the remote system 104 and the remote system 104 may send data to the display device 108. By sending and receiving data with the electronic device 102, the mobile device 138, and the display device 108, the remote system 104 allows a user 116 and a user 140 to control, via the remote system 104, the network application being executed by the remote system 104.

For instance, the remote system 104 may store application data 118 representing one or more network applications that are accessible by the control device 106 via the network(s) 114. A network application can include, but is not limited to, a gaming application, a word processing application, an educational application, a multimedia application (e.g., movie, music, etc.), and/or any other type of application that is capable of being accessed via the network(s) 114. In some instances, the remote system 104 may associate one or more of the network applications with a user profile. For instance, the remote system 104 may receive data indicating that the user 116 has acquired (e.g., purchased, leased, etc.) a network application from the remote system 104. In some instances, the remote system 104 may then store application data 118 indicating that the user 116 acquired by the network application. The remote system 104 may then allow the user 116 to access the network application using the control device 106. The user 140 may wish to use the network application as well but may not have a control device 106 equipped for network communications. Instead, the user 140 may use the control device 142 and the mobile device 138 to interact with the remote system.

To access a network application, the remote system 104 may send to the display device 108, data (e.g., video data, audio data, etc.) representing one or more network applications that are available to the user 116. In some instances, the one or more network applications may include one or more network applications that have been acquired by the user 116. In some instances, the one or more network applications may include one or more network applications that are free to users. In either example, the display device 108 may receive the data from the remote system 104. The display device 108 may then display image(s) that represent the one or more network applications that are available to the user 116. For example, the image(s) may include one or more identifiers (e.g., one or more names) of the one or more network applications that are available to the user 116.

The remote system 104 may then receive from control device 106 and the mobile device 138, input data 120 representing input(s) received by the control device 106 and the control device 142. The remote system 104 may analyze the input data 120 to identify a network application that is selected by the user 116 and/or the user 140. For example, the input(s) may correspond to movement(s) of an object, such as a cursor, across the image(s) representing the one or more network applications. The input(s) may further correspond to a selection of one of the network applications (e.g., a selection of a control on the control device 106 when the object is located over the selected network application). The remote system 104 may then determine, based at least in part on the selection, that the user 116 selected the network application.

In the example of FIG. 1, the user 140 may need to configure the mobile device 138 with the control device 142 and/or the selected network application, such as when the mobile device 138 has yet to be used with the control device 142 to control the network application. To configure the mobile device 138, the mobile device 142 may receive from the remote system 104, setup data 122 representing one or more controls associated with the network applications and/or a specific network application. As described herein, a control associated with a network application may include any input that may be processed by the remote system 104 in order to update a state of the network application.

For a first example, the remote system 104 may be configured to process specific controls for the network applications. The specific controls may include a first control associated with a joystick, a second control associated with a first type of button (e.g., an X-button), a third control associated with a second type of button (e.g., a Y-button), and/or the like. In some instances, the specific controls are associated with a specific type of control device that is manufactured to control the network applications. For example, the specific type of control may include input devices that include the joystick, the first type of button, the second type of button, and/or the like.

For a second example, the controls may be specific to a network application. For instance, and in the example of FIG. 1, the network application may include a gaming application in which the user 116 and/or user 140 controls an object, such as a character. As such, the controls may include, but are not limited to, a first control to move the character forward, a second control to move the character left, a third control to move the character right, a fourth control to move the character backwards, a fifth control to make the character jump, a sixth control to make the character perform an action (e.g., open a door, pickup an item, etc.), and/or any other type of control.

The control device 142, the mobile device 138, and/or the display device 108 may then request that the user 140 associate input devices of the control device 142 with the various controls. For example, and using the example above where the network application includes the gaming application, the display device 108 may display content associated with the first control (e.g., the joystick). The mobile device 138 may then receive input data 120 representing a selection of a first input device of the control device 142. Using the input data 120 and the setup data 122, the mobile device 138 may generate configuration data 124 that associates the selected first input device with the first control. Next, the display device 108 may display content associated with the second control (e.g., the X-button). The mobile device 138 may then receive input data 120 representing a selection of a second input device of the control device 106.

Using the input data 120 and the setup data 122, the mobile device 138 may generate configuration data 124 that associates the selected second input device with the second control. This process may continue until the user 140 has configured the controls of the network application. The mobile device 138 may then end the configuration process.

In some instances, the configuration data 124 may represent mapping data that maps the various input devices of the control device 142 with the various controls of the network application(s). For instance, the configuration data 124 may map an identifier of an input device with an identifier of the control of the network application. For example, if the input device includes a button, such as an A-button, and the control includes a second button, such as an X-button, the configuration data 124 may map the identifier of the "A-button" with the identifier of the control "X-button".

In some instances, the mobile device 138 stores the configuration data 124 such that the mobile device 138 can use the configuration data 124 when the user 140 uses the control device 142 to control the network application. For instance, the mobile device 138 may store the configuration data 124 in association with identifier data 126 representing an identifier of the network application and/or identifier data 126 representing an identifier of the control device 142. Additionally, or alternatively, in some instances, the mobile device 138 may send to the remote system 104, the configuration data 124 for storage by the remote system 104. The mobile device 138 may then receive from the remote system 104, the configuration data 124 when the user 140 uses the control device 142 to control the network application.

It should be noted that, in some examples, in addition to, or alternatively from, the mobile device 138 generating the configuration data 124, the configuration data 124 may have been previously generated and stored on the remote system 104. In such instances, the remote system 104 may send the configuration data 124 to the mobile device 138 based at least in part on determining the type of control device for which the mobile device 138 is connected and/or the identifier of the network application for which the control device 142 is being used to control. In other words, the remote system 104 may store configuration data 124 for various types of control devices and/or network applications. The remote system 104 may then provide the needed configuration data 124 to electronic devices that are connected to control devices when the control devices are used to control network applications. This may remove the need for the mobile device 138 to perform configuration whenever the mobile device 138 is connected to a new type of control device and/or being used to control a new network application.

The mobile device 138 may then use the configuration data 124 when the user 140 is controlling the network application using the control device 106. For instance, the mobile device 138 may receive from the control device 142, input data 120 representing a selection of an input device of the control device 142. The mobile device 138 may then use the configuration data 124 to determine that the input device is associated with a control of the network application. Based at least in part on the determination, the mobile device 138 may generate control data 128 representing the control. The mobile device 138 may then send the control data 128 to the remote system 104. Additionally, the mobile device 138 may continue to perform this process of receiving input data 120 representing the selections of the input devices, determining that the input devices are associated with controls, generating the control data 128 representing the controls, and sending the control data 128 to the remote system 104.

In some instances, the mobile device 138 sends the control data 128 to the remote system 104 whenever the mobile device 138 receives the input data 120 from the control device 142. This may reduce the latency it takes between the control device 142 receiving the input and the remote system 104 receiving the control data 128. In some instances, the mobile device 138 sends the control data 128 at given time intervals. The mobile device 138 may send the control data 128 at the given time intervals when the mobile device 138 is performing processes to conserve internal power.

The remote system 104 may use this control data 128 to update the state of the network application. For example, the remote system 104 may send to the display device 108, data representing a first state of the network application. The data may include first video data 130 representing image(s) of the first state of the network application, first audio data 132 representing sound corresponding to the first state of the network application, and/or first timestamp data 134 representing a time for displaying the first state of the network application and/or a time for outputting the sound. In some instances, the remote system 104 sends a first data packet that includes the first video data 130, the first audio data 132, and/or the first timestamp data 134. In other instances, the remote system 104 may separately send the first video data 130, the first audio data 132, and/or the first timestamp data 134 to the display device 108.

The display device 108 may receive the data (and/or the first data packet) from the remote system 104. Using the first video data 130, the display device 108 may display image(s) representing the first state of the network application. For example, if the network application includes a gaming application, the display device 108 may display content representing a first state of the game. In the example of FIG. 1, the first state of the game may include an object (e.g., a character) located at a first position in a gaming environment (e.g., a forest). In some instances, the display device 108 may further output the sound represented by the first audio data 132. In some instances, the display device 108 displays the image(s) and/or outputs the sound according to the time(s) represented by the first timestamp data 134.

In some instances, the remote system 104 may additionally send to the mobile device 138, data representing the first state of the network application. The data may include second audio data 132 representing sound corresponding to the first state of the network application and/or second timestamp data 134 representing a time for outputting the sound. In some instances, the remote system 104 sends a second data packet that includes the second audio data 132 and/or the second timestamp data 134. In other instances, the remote system 104 may send the second audio data 132 separately form the second timestamp data 134. The mobile device 138 may then send the data to the control device 142, which may output the sound represented by the second audio data 132. In some instances, the control device 142 may output the sound according to the time represented by the second timestamp data 134. In some instances, the first timestamp data 134 and/or the second timestamp data 134 synchronizes the outputting of the sound by the control device 142 with the displaying of the image(s) by the display device 108.

The user 140 can then use the control device 142 to provide inputs to the network application. For instance, the control device 142 may receive an input, such as a selection of an input device. The control device 142 may then send to the mobile device 138, input data 120 representing the selection of the input. Using the configuration data 124, the mobile device 138 may determine that the input device is associated with a control. The mobile device 138 may then generate control data 128 representing the control and send the control data 128 to the remote system 104.

Using the control data 128, a processing component 136 may update the first state of the network application to a second state of the network application. For example, and using the example above where the network application includes the gaming application, the control may be associated with moving the object forward by a given amount within the gaming environment. As such, the processing component 136 may analyze the control data 128 to determine that the input includes moving the object forward by the given amount. The processing component 136 may then update the first state of the of the network application to the second state of the network application by moving the object forward in the environment by the given amount.

The remote system 104 may then send data representing the second state of the network application to the display device 108. The data may include third video data 130 representing image(s) of the second state of the network application, third audio data 132 representing sound corresponding to the second state of the network application, and/or third timestamp data 134 representing a time for displaying the second state of the network application and/or a time for outputting the sound. In some instances, the remote system 104 sends a third data packet that includes the third video data 130, the third audio data 132, and/or the third timestamp data 134. In other instances, the remote system 104 may separately send the third video data 130, the third audio data 132, and/or the third timestamp data 134 to the display device 108.

The display device 108 may receive the data (and/or the third data packet) from the remote system 104. Using the third video data 130, the display device 108 may display image(s) representing the second state of the network application. For example, and again using the example where the network application includes the gaming application, the display device 108 may display the object located at the second position within the gaming environment. In some instances, the display device 108 may further output the sound represented by the third audio data 132. In some instances, the display device 108 displays the image(s) and/or outputs the sound according to the time(s) represented by the third timestamp data 134.

In some instances, the remote system 104 may additionally send to the mobile device 138, data representing the second state of the network application. The data may include fourth audio data 132 representing sound corresponding to the second state of the network application and/or fourth timestamp data 134 representing a time for outputting the sound. In some instances, the remote system 104 sends a fourth data packet that includes the fourth audio data 132 and/or the fourth timestamp data 134. In other instances, the remote system 104 sends the fourth audio data 132 separately from the fourth timestamp data 134. In either instance, the mobile device 138 then sends the data to the control device 142, which may then output the sound represented by the fourth audio data 132. In some instances, the control device 106 may output the sound according to the time represented by the fourth timestamp data 134. In some instances, the third timestamp data 134 and/or the fourth timestamp data 134 synchronizes the outputting of the sound by the control device 142 with the displaying of the image(s) by the display device 108.

In some instances, the remote system 104 may continue to receive control data 128 from the mobile device 138. The processing component 136 may then continue to process the control data 128 in order to update the state of the network application. Based at least in part on the updating, the remote system 104 may continue to send to the display device 108, data (e.g., video data 130, audio data 132, timestamp data 134, etc.) representing the current state of the network application. In some instances, the remote system 104 sends the data to the display device 108 as a data packet. The remote system 104 may further send to the mobile device 138, data (e.g., audio data 132, timestamp data 134, etc.) representing the current state of the network application. In some instances, the remote system 104 sends the data to the mobile device 138 as part of a data packet.

By performing the processes described above, the user 140 is able to control the network application, being executed by the remote system 104, using different types of control devices. For example, and using similar processes, the user 140 may connect different types and styles of control devices to the mobile device 138. The mobile device 138 may then perform the configuration processes described herein in order to obtain configuration data 124 for the second control device. Additionally, the mobile device 138 may use the configuration data 124 to send control data 126 to the remote system 104 as the second control device is receiving the inputs from the user 140.

Figure 2:
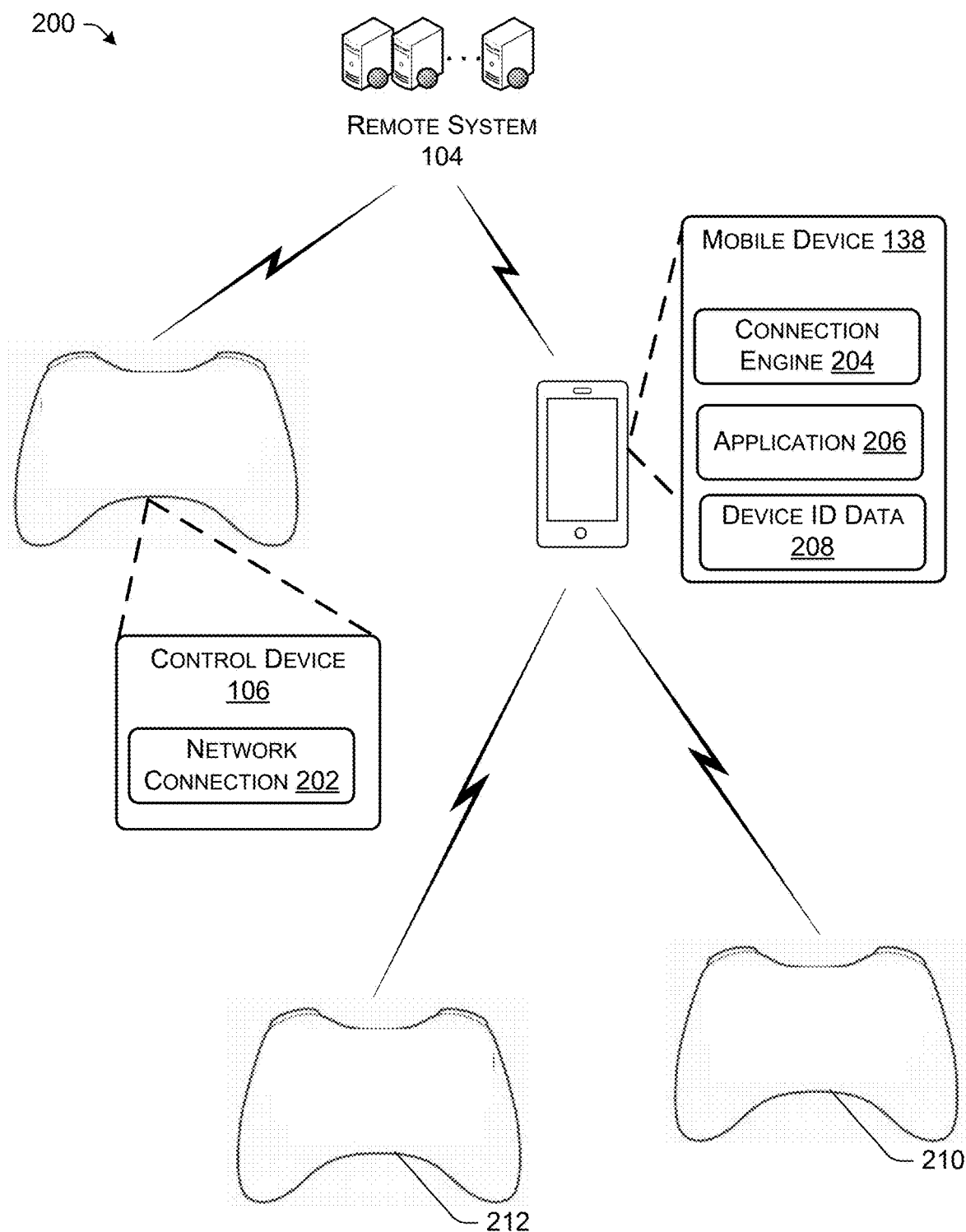
FIG. 2 illustrates an example system architecture for controlling network applications using various control devices, according to various aspects of the present disclosure.

FIG. 2 illustrates an example system architecture 200 for controlling network applications using various control devices, according to various aspects of the present disclosure. In the system architecture, the remote system 104 of FIG. 1 is illustrated as a server that may host one or more network applications that one or more users wish to interact with. The users may use different types of control devices, such as control device 106 which includes a network connection 202. The network connection 202 may enable a first type of control device to communicate directly with a network device, such as an access point, and communicate, through the access point, with the remote system 104.

In some examples, one or more other users may wish to use other control devices, such as first control device 210 and second control device 212. The first control device 210 and the second control device 212 may not include a network connection 202 and therefore are unable to communicate with the access point to reach the remote system. For instance, third-party control devices may not include such network devices but instead may only include wired and/or certain wireless communication devices (e.g., BLUETOOTH(R)). The communication systems of the first control device 210 and the second control device 212 are not able to communicate with the remote system 104. Instead, the mobile device 138, such as a smartphone, is connected to the first control device 210 and the second control device 212 to enable communication with the remote system 104.

The mobile device 138 includes a connection engine 204 that enables connections with the first control device 210 and the second control device 212, for example over a USB connection and/or a wireless communication such as BLUETOOTH(R). The connection engine 204 may include hardware and software components to enable such communications between the devices.

The mobile device 138 also includes an application 206 that may provide some or all of the functionality described herein, including selecting control devices, configuring control devices, and other such processes. The application 206 may enable a user to select one or more device to connect, for example, to a single display 108. The application 206 may enable the user to set various settings and preferences related to the use of the control devices. The application 206 may also receive the inputs from the control devices and call the remote system 104 to perform one or more actions based on the received inputs. In this manner, the mobile device 138 may serve to provide the network-connectability function to various third-party control devices to enable them to interact with the remote system 104 in the same manner as the control device 106.

The mobile device 138 also includes device identification data 208 that may be used to uniquely identify different control devices. For instance, the first control device 210 and the second control device 212 may simultaneously connect, through the mobile device 138, to the remote system 104. Inputs and/or commands from the first control device 210 and/or the second control device 212 may be uniquely identified based on a unique ID of the control devices.

In an illustrative example, a user may control an application executing on a remote system 104 using a control device 106 that communicates with a remote system via a network connection 202 using communication hardware, e.g., a Wi-Fi chip, or other such components within the control device rather than through a console or other physical hardware. In some examples, the user may wish to use a control device other than one provided with the remote system based on their preferences. For instance, the user may wish to interact with a network-based game using a game controller other than the game controller provided for the system.

A user may interact with a remote system 104 that may have originally been intended for use with specific controllers including communication components (e.g., Wi-Fi capability or other network capability) not typically part of such controllers. The user may select their preferred control device, such as first control device 210 and second control device 212 and connect through a mobile device 138 (e.g., a smartphone) through a wired or wireless connection to then connect to the remote system 104 while also enabling use of the third-party control device. For instance, the first control device 210 may send data to the remote system 104, where the data represents at least inputs received by the first control device 210. The remote system 104 may then update a current state of the network application using the data received from the first control device 210. Additionally, the remote system 104 may send, via a network, video data to a display device, where the video data represents the current state of the network application. As such, and in some instances, an additional electronic device, such as a video game console, may not be required to execute the network application and/or process the data from the control device. In such examples, this may remove the need of the additional electronic device. The mobile device 138 may host a mobile application that performs some or all of the processes described herein.

In some instances, the user may want to use different types of control devices to control the network application. For example, if the network application includes a gaming application, the control devices may include, but are not limited to, an XBOX® game controller, a PLAYSTATION® game controller, a NINTENDO® game controller, and/or any other type of game controller. However, since the different types of game controllers may include different types of input devices, one or more of the game controllers may not be compatible and/or configured for the gaming application. This may cause it so that the user is not able to use one or more of the game controllers with the network game.

As such, the application describes an electronic device that is able to configure different types of control devices so that the control devices are compatible for network applications. For example, the user may connect the mobile device to a control device. In some instances, the electronic device includes a wired connector, such as a Universal Serial Bus (USB), cable, and/or other types of connector, that the electronic device uses to establish a wired connection with the control device. Additionally, or alternatively, in some instances, the mobile device includes a network interface that the electronic device uses to establish a wireless connection with the control device. The wireless connection may include, but is not limited to, a Bluetooth connection, a Zigbee connection, and/or any other type of wireless connection.

The electronic device may also establish a connection with a mobile device, such as a smartphone, that has network-connective capability. In some instances, the mobile device may be connected to the control device using a wired connector, such a USB, cable, and/or other types of connector, that the mobile device uses to establish a wired connection with the network device, e.g., server, hosting the network application. Additionally, or alternatively, in some instances, the mobile device includes a network interface that the mobile device uses to establish a wireless connection (e.g., Internet connection) with the server. In either instance, the mobile device may use network data representing configuration settings, such as a Service Set Identifier (SSID) and password, to establish the connection with the server.

Figure 3:
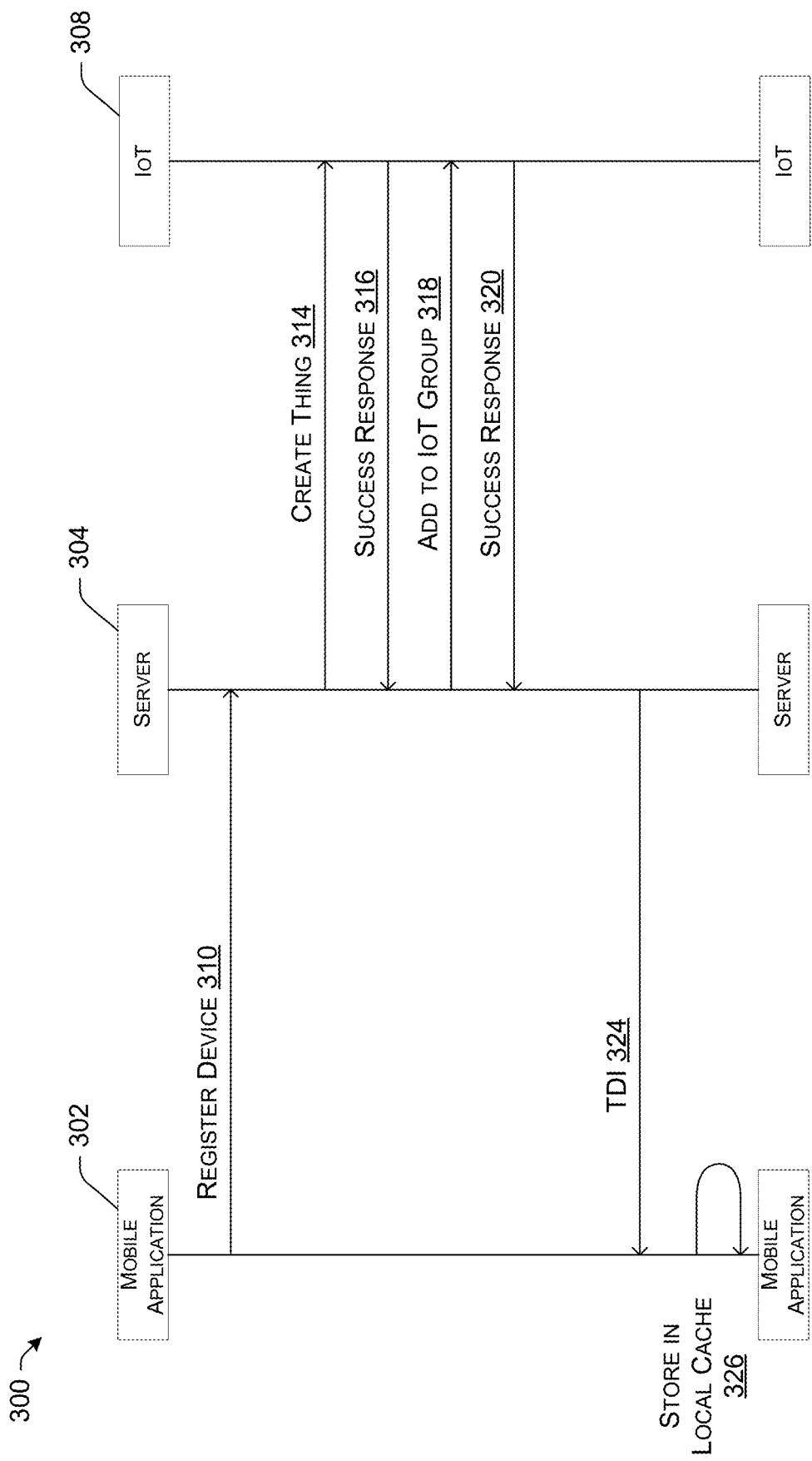
FIG. 3 illustrates an example sequence for registration of control devices connecting to a network application through a mobile device hub, according to various aspects of the present disclosure.

FIG. 3 illustrates an example sequence 300 for registration of control devices connecting to a network application through a mobile device hub, according to various aspects of the present disclosure. The sequence 300 includes actions performed by a mobile application 302, server 304, and IoT service 308. To register a control device at a first launch of the system, the mobile application 302 (connected to the control device) performs a call to register the device as an IoT device at 310 and will provide a device serial number and device role, such as the type of control device and/or such configuration data.

When the server 304 receives the call to register the device at 310, the server 304 may add an authorization to the request and pass the register call at to an IoT service 308. The server 304 calls to create a new thing at 314 to the IoT service 308 and receive a success response 316. The server 304 may also add the newly added device to a group of IoT items (e.g., other control devices for the user and/or mobile device) at 318 with a success response at 320. Once the success response is received at 320 and passed to the server 304 and mobile application 302 at calls 322 and 324, the mobile application 302 will store the new registered device in a local cache at 326. In this manner, when the mobile application 302 is opened, the registered device list is reused to retrieve IoT connection information. In some examples, the information may be retrieved from the local cache when a client device is launched, eliminating the need for re-pairing the control device repeatedly.

Figure 4:
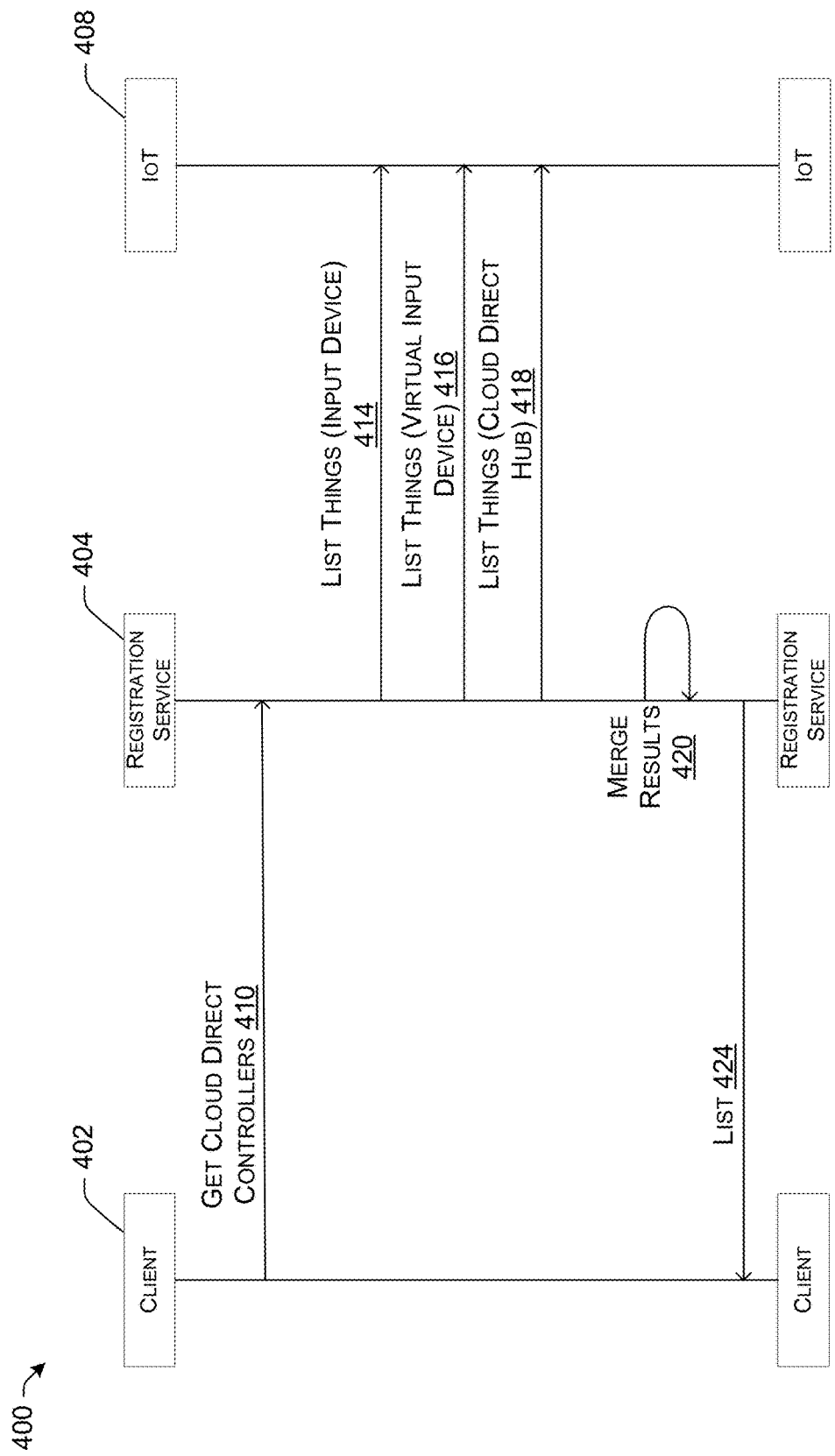
FIG. 4 illustrates an example sequence for identifying and selecting control devices for controlling a network application through a mobile device hub, according to various aspects of the present disclosure.

FIG. 4 illustrates an example sequence 400 for identifying and selecting control devices for controlling a network application through a mobile device hub, according to various aspects of the present disclosure. The clients 402 may represent potential devices that may be used to display or otherwise interact with data from the remote system.

When the remote system launches, e.g., when a device is powered on to interact with the remote system 104, the client 402 will call at 410, the registration service 404 to receive the cloud-connected control devices registered and associated with the device. The registration service 404 continues the call 412 to get all the control devices registered to the user. The registration service 404 may then query the IoT service 408 for the list at 414, 416, and 418. The different lists for the different commands may include input devices, such as control device 106 directly connecting to the remote system 104 over the network 114 as well as virtual controllers at 416 and cloud-connected control devices, such as the first control device 210 at 418. The list may then be merged at 420 and returned at 424 to the client to provide the list of available control devices that the user may select.

Figure 5:
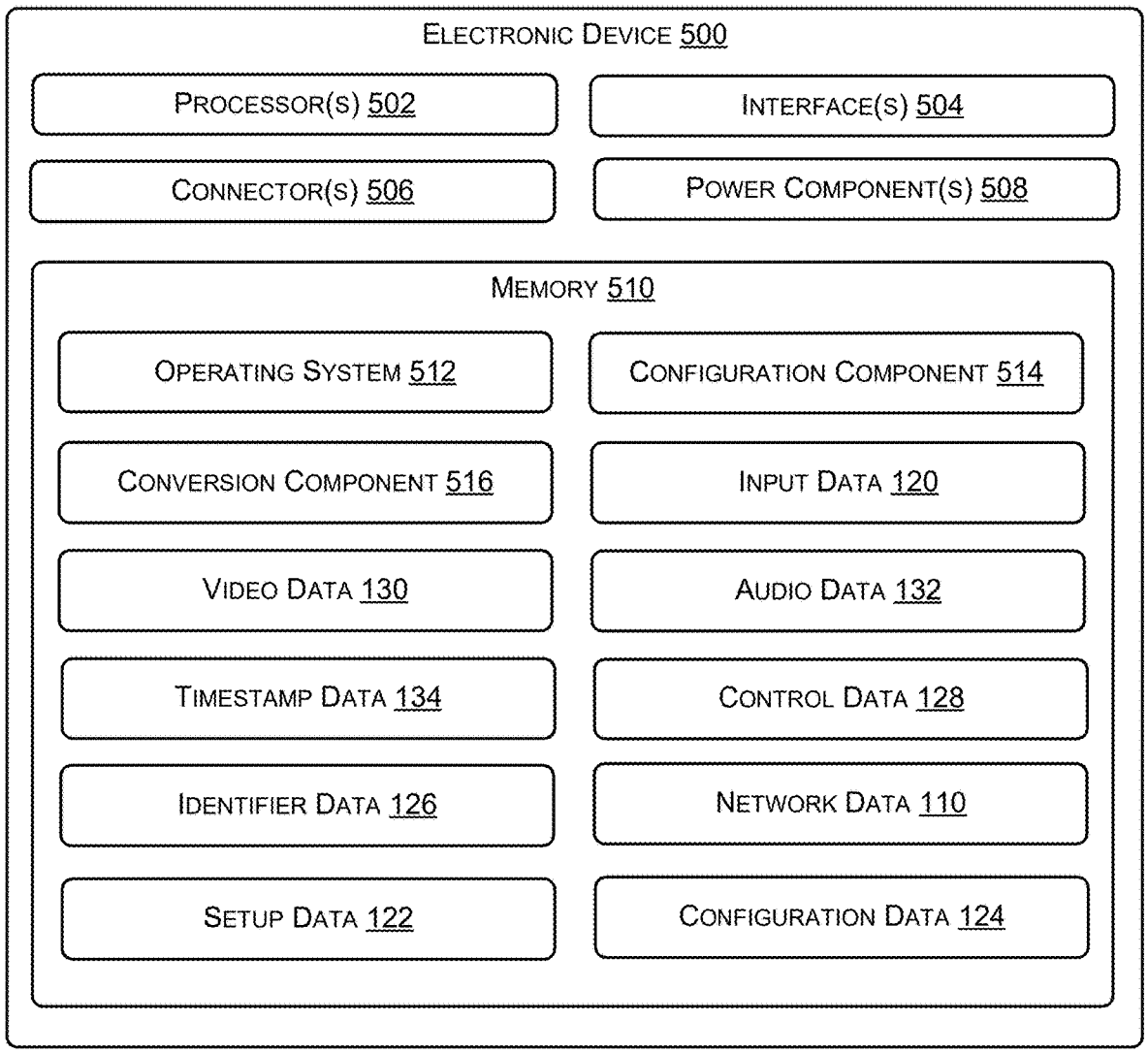
FIG. 5 illustrates a block diagram of an example architecture of an electronic device, according to various aspects of the present disclosure.

FIG. 5 illustrates a block diagram of an example architecture of the electronic device 500. The electronic device 500 may include the control device 106 and/or the control device 210 and 212 as well as the mobile device 138. As shown, the electronic device 500 may include processor(s) 502, network interface(s) 504, connector(s) 506, power component(s) 508, and memory 510. In some instances, the electronic device 500 may include one or more additional components not illustrated in the example of FIG. 5. Additionally, or alternatively, in some instances, the electronic device 500 may not include one or more of the network interface(s) 504, the connector(s) 506, or the power component(s) 508.

The power component(s) 508 may be configured to provide power to the electronic device 500. For a first example, power component(s) 508 may include one or more batteries. In such an example, the connector(s) 506 may include components that connector to a source of external power for charging the power component(s) 508. For a second example, the power component(s) 508 may include components connected to a source of external power, such as AC (alternating-current) power (alternatively referred to herein as "AC mains" or "wall power") and/or the control device.

As shown, the memory 510 may store at least an operating system 512, a configuration component 514, and a conversion component 516. The configuration component 514 may be configured to configure the electronic device 500 with various control devices and/or network applications. For instance, the configuration component 514 may determine that the electronic device 500 is to configure the control device with a network application. As such, the configuration component 514 may use the setup data 122 associated with the network application and the input data 120 received from the control device to generate the configuration data 124, using the processes described herein.

In some instances, the configuration component 514 determines to configure the control device 106 with the network device using identifier data 126 received from the control device. For a first example, and using the identifier data 126 associated with the control device, the configuration component 514 may determine that this is the first time that the electronic device 500 has connected to the control device and as such, the electronic device 500 needs to be configured for the control device. For a second example, and again using the identifier data 126 associated with the control device, the configuration component 514 may determine that there is not configuration data 124 stored in the memory 510 and associated with the control device.

Additionally, or alternatively, in some instances, the configuration component 514 determines to configure the control device with the network application using identifier data 126 associated with the network application, where the identifier data 126 may be received from the remote system 104. For a first example, and using the identifier data 126 associated with the network application, the configuration component 514 may determine that this is the first time that the electronic device 500 has connected to the control device in order to control the network application. For a second example, and again using the identifier data 126 associated with the network application, the configuration component 514 may determine that there is not configuration data 124 stored in the memory 510 and associated with the network application.

In some instances, after configurating the control device with the network application, such as by generating the configuration data 124, the configuration component 514 is configured to cause storing of the configuration data 124 in the memory 510. Additionally, or alternatively, in some instances, after configurating the control device with the network application, the configuration component 514 is configured to cause the electronic device 500 to send the configuration data 124 to an external device, such as the remote system 104, the control device, the display device, and/or the like.

The conversion component 516 may be configured to convert the input received by the control device to controls that can be used by the remote system 104 for updating the state of the network application. For example, the conversion component 516 may analyze the input data 120 received from the control device. Based at least in part on the analysis, the conversion component 516 may determine that the input data 120 represents selections of input devices of the control device. The conversion component 516 may then use the configuration data 124 to determine that the input devices are associated with controls of the network application. Based at least in part on the determinations, the conversion component 516 may generate the control data 128 representing the controls and cause the electronic device 500 to send the control data 128 to the remote system 104.

As further illustrated in FIG. 5, the electronic device 500 includes the processor(s) 502, the network interface(s) 504, and the memory 510. As used herein, a processor may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, discussed herein, may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Network interface(s) may enable messages between devices, such as the electronic device 500, the remote system 104, the control device, the display device 108, the mobile device 138, one or more other control devices, and/or with one or more other remote systems, as well as other networked devices. The network interface(s) may include one or more network interface controllers (NICs) or other types of transceiver devices to send and receive messages over the network(s) 114. For instance, each of the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (Wi-Fi), or any other PAN message protocol. Furthermore, each of the network interface(s) may include a wide area network (WAN) component to enable message over a wide area network.

In some instances, the network interface(s), such as the network interface(s) 504, may include wired connector(s) for establishing wired connections between devices. The wired connector(s) may include, but are not limited to, USB(s), cable(s), wire(s), and/or any other type of physical connector.

Figure 6:
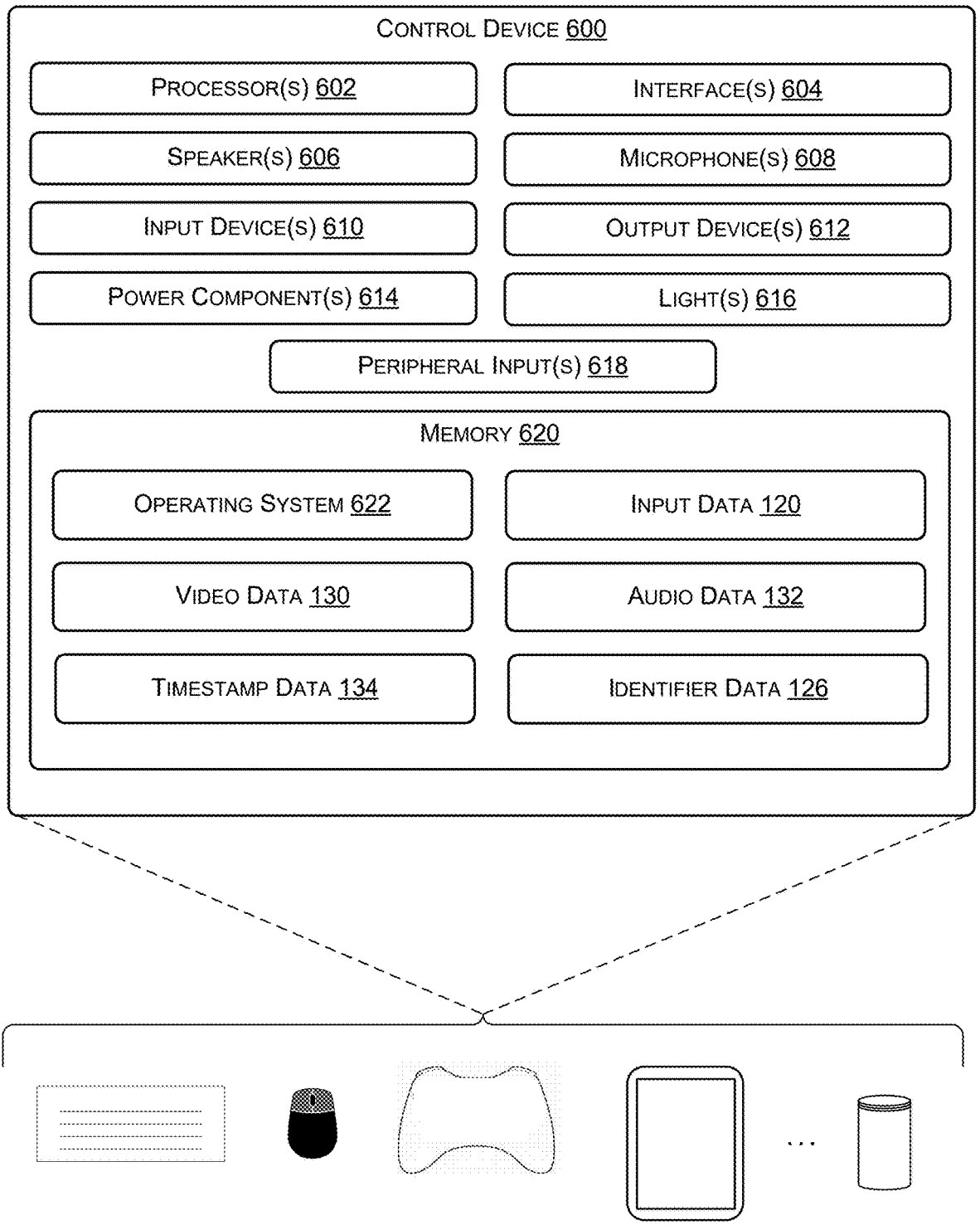
FIG. 6 illustrates a block diagram of an example architecture of a control device, according to various aspects of the present disclosure.

FIG. 6 illustrates a block diagram of an example architecture of the control device 600. As shown, the control device 600 includes processor(s) 602, network interface(s) 604, speaker(s) 606, microphone(s) 608, input device(s) 610, output device(s) 612, power component(s) 614, light(s) 616, peripheral input(s) 618, and memory 620. In some instances, the control device 600 may include one or more additional components not illustrated in the example of FIG. 6. Additionally, or alternatively, in some instances, the control device 600 may not include one or more of the speaker(s) 606, the microphone(s) 608, the input device(s) 610, the output device(s) 612, the light(s) 616, or the peripheral input(s) 618.

Although the control device 600 is illustrated as having one or more integral speaker(s) 606, in other examples, the control device 600 may not include speaker(s) 606. For example, the control device 600 may produce an audio output signal that drives an external loudspeaker, such as headphones connected to the control device 600 via a peripheral input 618. As another example, the control device 600 may drive or control an external loudspeaker through a wireless data connection such as a Bluetooth connection. In other situations, the control device 600 may be used in conjunction with a loudspeaker device that receives audio data and other instructions from the remote system 104, rather than from the control device 600.

The microphone(s) 608 may include sensors (e.g., transducers) configured to receive sound. The microphone(s) 608 may generate input signals for audio input (e.g., sound). For example, the microphone(s) 608 may determine digital input signals for an utterance of a user. In some instances, the microphone(s) 608 are implemented in an array. The array may be arranged in a geometric pattern, such as a linear geometric form, circular geometric form, or any other configuration. For example, for a given point, an array of four sensors may be placed in a circular pattern at 90-degree increments (e.g., 0, 90, 180, 6115) to receive sound from four directions. The microphone(s) 608 may be in a planar configuration, or positioned apart in a non-planar three-dimensional region. In some instances, the microphone(s) 608 may include a spatially disparate array of sensors in data communication. For example, a networked array of sensors may be included. The microphone(s) 608 may include omni-directional microphones, directional microphones (e.g., shotgun microphones), and so on.

In some instances, the microphone(s) 608 and the speaker(s) 606 facilitate interactions, such as dialogue, with a user. The microphone(s) 608 produce audio data representing sound from the environment of the control device 600, such speech utterances by the user. The audio data produced by the microphone(s) 608 may comprise directional audio signals or may be used to produce directional audio signals, where each of the directional audio signals emphasizes audio from a different radial direction relative to the microphone(s) 608.

The input device(s) 610 may include button(s), key(s), joystick(s), touch-sensitive pad(s), trigger(s), sensor(s) that detect movement of the control device 600 (e.g., accelerometer(s), magnetometer(s), etc.), and/or any other type of device that is able to receive input from the user. The output device(s) 612 may include devices that provide feedback to the user. For instance, the output device(s) 612 may include haptic driver(s) that cause actuator(s) to activate.

The power component(s) 614 may be configured to provide power to the control device 600. For a first example, power component(s) 614 may include one or more batteries. For a second example, the power component(s) 614 may include components connected to a source of external AC (alternating-current) power, such as a household AC power supply (alternatively referred to herein as "AC mains" or "wall power").

The light(s) 616 may include visual indicator(s) (e.g., light-emitting diodes (LEDs)) that emit light when activated by the control device 600. In some instances, the visual indicator(s) may include a light ring disposed on a portion of the control device 600. In other instances, the visual indicator(s) may be disposed on various portions on the control device 600. The peripheral input(s) 618 may include one or more components for connecting peripheral devices to the control device 600. For instance, a peripheral input 618 may include a jack for connecting headphones to the control device 600.

The control device 600 may include memory 620. The memory 650 may be used to store any number of software components that are executable by the processor(s) 602. Software components stored in the memory 620 may include an operating system 622 that is configured to manage hardware and services within and coupled to the control device 600.

As further illustrated in FIG. 6, the memory 620 may include the input data 120 generated by the control device 600, where the control device 600 sends the input data 120 to at least the mobile device 138. Additionally, the memory 620 may include the video data 130, the audio data 132, and/or the timestamp data 134 that the control device 600 receives from the mobile device 138. Additionally, the memory 620 may store the identifier data 126 that the control device 600 may send to the mobile device 138.

Figure 7:
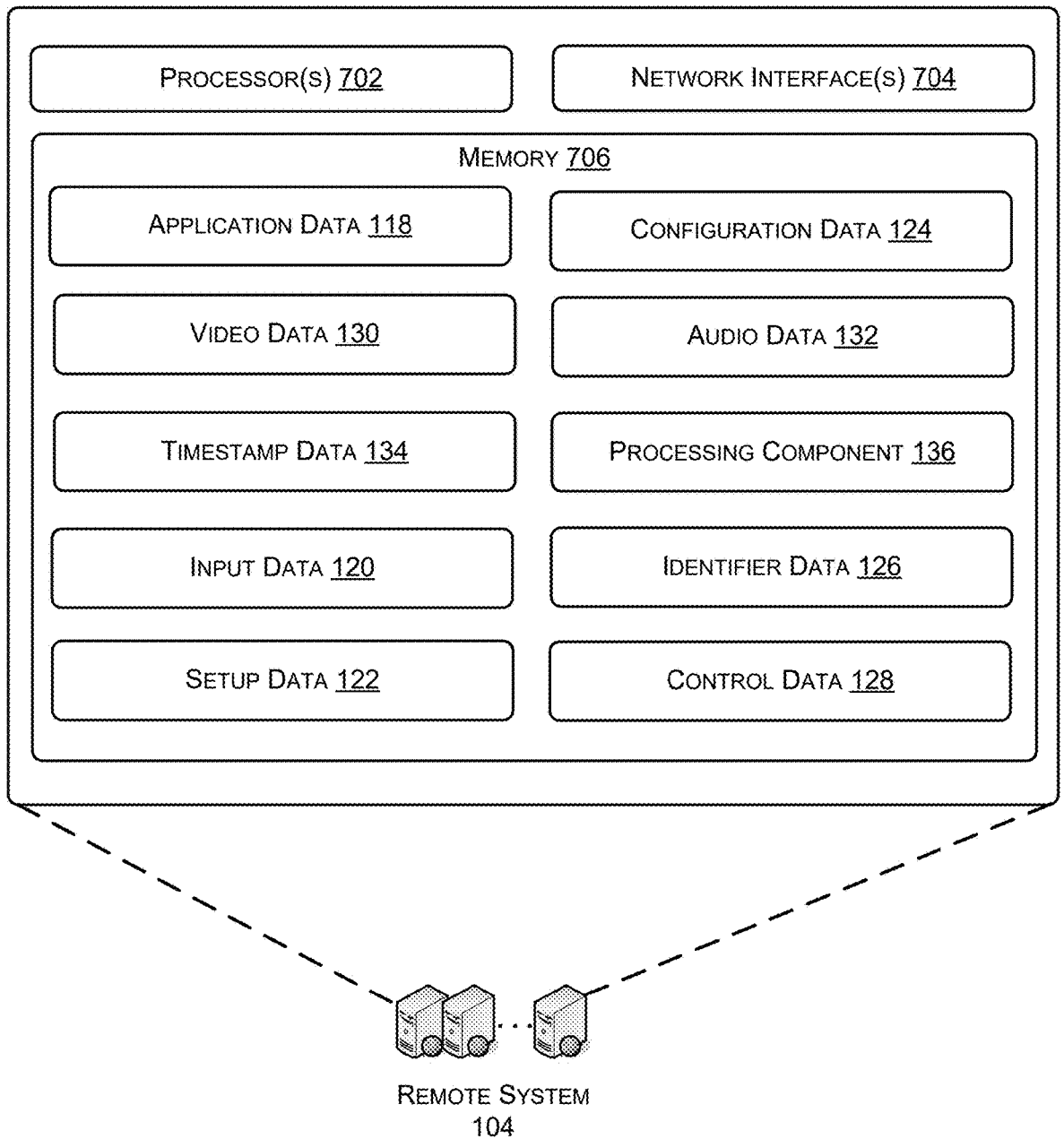
FIG. 7 illustrates a block diagram of an example architecture of a remote system, according to various aspects of the present disclosure.

FIG. 7 illustrates a block diagram of an example architecture of the remote system 104 that is configured to communicate with the mobile device 138, the control device 142, the control device 106 and the display device 108. As shown, the remote system 104 may include processor(s) 602, network interface(s) 604, and memory 620.

As further illustrated in FIG. 7, the remote system 104 may store the configuration data 124. In some instances, the remote system 104 may use the configuration data 124 to perform similar processes as the mobile device 138 described herein. For instance, the remote system 104 may receive from the mobile device 138 input(s) received by the control device 142. The remote system 104 may then analyze the input data 120, using the configuration data 124, to determine control(s) being selected by the user 140. The remote system 104 may then use the determined control(s) to update the state of the network application.

Figure 8:
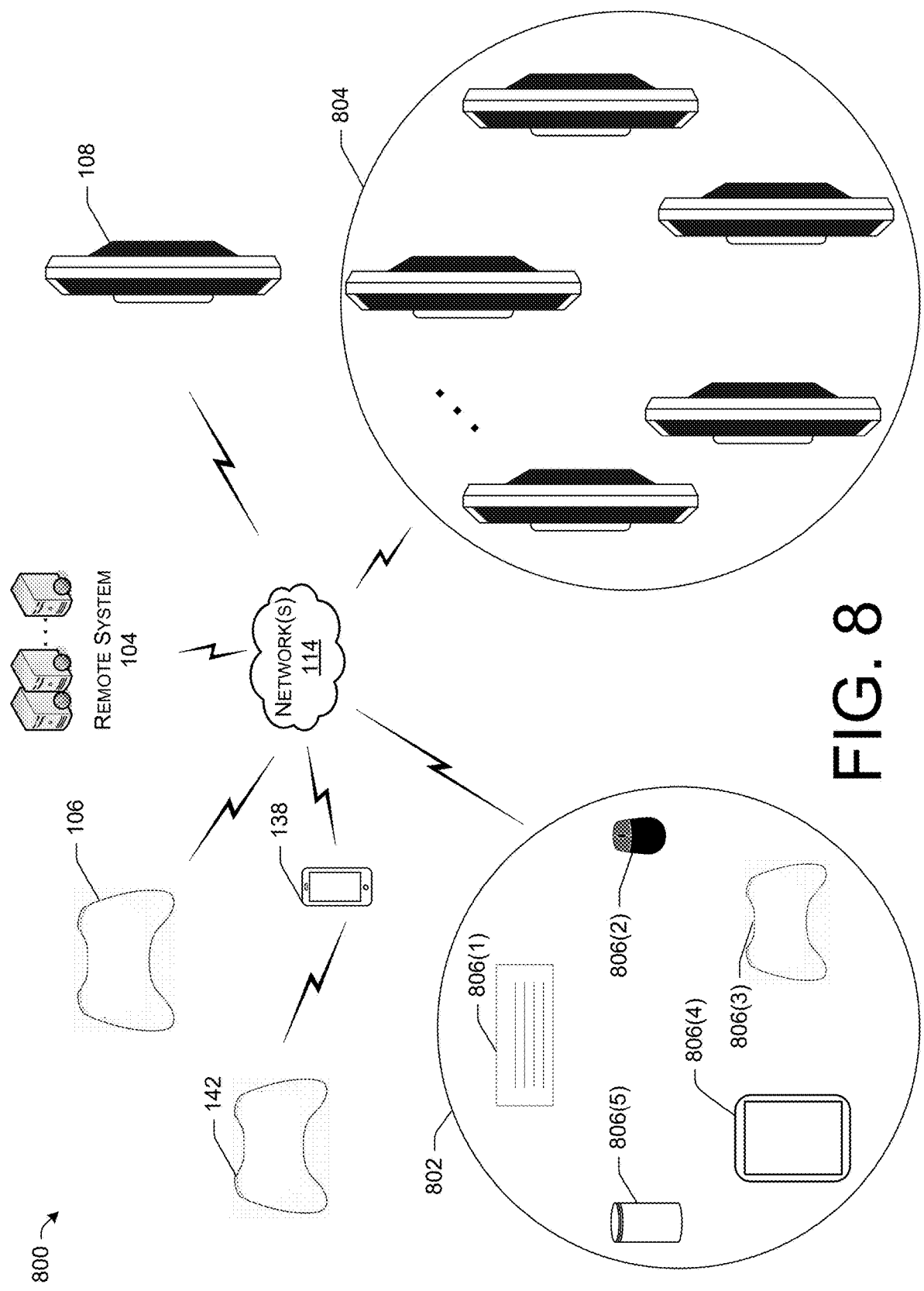
FIG. 8 illustrates a schematic diagram of an example system for communicating with multiple electronic devices and display devices in a network, according to various aspects of the present disclosure.

FIG. 8 illustrates a schematic diagram of an example system 800 for communicating with multiple controlling devices and display devices in a network. The system 800 may include, for example, the remote system 104, the control device 106, the display device 108, the mobile device 138, the control device 142, one or more additional control devices 802, one or more additional display devices 804, and/or one or more additional control devices 806(1)-(5) (also referred to as "control device 806" and/or "control devices 806"). As illustrated, the control devices 806 may include a wide variety of input devices that a user may use to provide a variety of inputs to the remote system 104.

In the example of FIG. 8, the remote system 104 may receive, over the network(s) 114, control data 128 from the mobile device 138. The remote system 104 may then update, using the control data 128, a local state of an application that is associated with the control device 142. Additionally, the remote system 104 may send to the display device 108 and over the network(s) 114, video data 130, audio data 132, and/or timestamp data 134 that represents the local state of the network application associated with the control device 142. Furthermore, the remote system 104 may send, over the network(s) 114 and to the one or more display devices 804, data representing the current local state of the network application associated with the control device 142.

The remote system 104 may also perform similar processes for each of the other one or more other control devices 802. For example, the remote system 104 may receive, over the network(s) 114, control data 128 from a control device 806. The remote system 104 may then update, using the control data 128, a local state of an application that is associated with the control device 806. Additionally, the remote system 104 may send to a display device 804 (associated with the control device 806) and over the network(s) 114, video data 130, audio data 132, and/or timestamp data 134 that represents the local state of the network application associated with the control device 806. Furthermore, the remote system 104 may send, over the network(s) 114 and to the display device 108 and/or one or more other display devices 804, data representing the current local state of the network application associated with the control device 806.

In some instances, such as when the network application includes a gaming application, the remote system 104 may store an authoritative version of the environment of the game. The remote system 104 may then use the control data 128 from the control devices to update the positions of objects (e.g., characters, vehicles, buildings, etc.) within the environment. As such, the data representing a local state of the network application that is associated with a control device, such as the control device 142, may represent the position(s) of object(s) that are controlled by the control device. The remote system 104 sends this data to the display device 108 and/or the one or more display device 804 such that the display device 108 and/or the one or more display devices 804 can update the position(s) of the object(s).

For example, a first local state of the network application associated with the control device 142 may be different than a second local state of the network application associated with the control device 802. For example, such as during a multiplayer network game, first local state of the network application associated with the control device 142 may represent a first position of a first object within a gaming environment, where the control device 142 is configured to control the first object. As such, the display device 108 may be displaying image(s) that represent the first local state of the network application. Additionally, the second local state of the network application associated with the control device 802 may represent a second position of a second object within the gaming environment, where the control device 802 is configured to control the second object. As such, the display device 804 (associated with the control device 802) may be displaying image(s) that represent the second local state of the network application.

In such instances, when the remote system 104 updates the second local state of the network application associated with the control device 802, such as by changing the position of the second object within the gaming environment, the remote system 104 may further update the first local state of the network application to include the updated position of the second object. As such, the first local state of the network application may represent both the first position of the first object and the updated position of the second object.

Although the above examples include network applications with multiple users, in other instances, the control device 142 may be associated with both the display device 108 and one or more of the display devices 804. For example, as the remote system 104 is receiving the control data 128 from the mobile device 138 and updating the state of a network application using the control data 128, the remote system 104 may be sending, over the network(s) 114, data (e.g., video data 130, audio data 132, timestamp data 134, etc.) to the display device 108 and a second display device 804. In some instances, the data sent to the display device 108 may be the same as the data that is sent to the second display device 804. For example, the display device 108 and the second display device 804 may be displaying similar content (e.g., image(s) representing a state of the network application). Additionally, the display device 108 and the second display device 804 may be receiving similar timestamp data 134 that causes the display device 108 and the second display device 804 to synchronize displaying of the content.

In some instances, the data sent to the display device 108 may be different than the data that is sent to the second display device 804. For example, the display device 108 and the second display device 804 may operate as a "split-screen" where the display device 108 displays a first portion of the content and the second display device 804 displays a second portion of the content. Additionally, the display device 108 and the second display device 804 may be receiving similar timestamp data 134 that causes the display device 108 and the second display device 804 to synchronize displaying of the content.

In some instances, the control device 142 and one or more other control devices 802 may be associated with the display device 108. For example, a first user may be using the control device 142 to control the network application while a second user is using a second control device 802 to control the network application. For instance, the remote system 104 may be receiving, over the network(s) 114, data (e.g., control data 128) from the control devices 806 either through mobile devices 138 and/or directly from control devices capable of interfacing with the network 114. The remote system 104 may then update the state of the network application using the data that is received from each control device. Additionally, the remote system 104 may be sending, over the network(s) 114, data (e.g., video data 130, audio data 132, timestamp data 134, etc.) to the display device 108 that represents the current state of the network application.

In some instances, and in each of the examples described above, the control device 106 and one or more of the control devices 802 may be located in the same environment and/or the display device 108 and/or one or more of the display devices 804 may be located in the same environment. In some instances, and in each of the examples described above, the control device 106 and one or more of the control devices 802 may be located in separate environments and/or the display device 108 and/or one or more of the display devices 804 may be located in separate environments.

In the example of FIG. 8, the one or more control devices 802 and/or the one or more display devices 804 may respectively be similar to the control device 142 and/or the display device 108. In other examples, one or more of the control devices 802 and/or one or more of the display devices 804 may respectively be different than the control device 142 and/or the display device 108. For example, one or more of the control devices 802 may correspond to a video game console that processes inputs from a user. After processing the inputs, the video game console may send data to the remote system 104, where the data represents changes the local state of the network application.

In the example of FIG. 8, the electronic devices may send and receive data with one another. For example, the mobile device 138 may receive control data 128 from a second control device 802. In some instances, the mobile device 138 may further receive from the second control device 802, timestamp data 134 indicating a time at which the second control device 802 received the input associated with the control data 128 and/or a time at which the second electronic device 802 sent the control data 128. The mobile device 138 may then send, over the network(s) 114, the received control data 128 and/or timestamp data 134 to the remote system 104. In some instances, the remote system 104 may further receive, over the network(s) 114, the same control data 128 and/or timestamp data 134 from the second electronic device 802.

In some instances, by having the electronic devices communicate with one another by sending the data, and by having the electronic devices send the data to the remote system 104, the remote system 104 may better synchronize the controlling of the network application. For a first example, by receiving the same control data 128 and/or timestamp data 134 from more than one electronic device, the remote system 104 may still receive the control data 128 and/or the timestamp data 134 even if one of the electronic devices has network problems and cannot send the data. For a second example, and since each electronic device may be sending the control data 128 and/or timestamp data 134 being output by all of the electronic devices, the remote system 104 may be able to better process the control data 128 in the order at which the control data 128 was generated.

In examples where the electronic devices communicate with one another, the electronic devices may use a different type of network connection to communicate with one another. For example, the electronic devices may use a short-range network connection, such as Bluetooth, to communicate with one another, while using a long-range network connection, such as the Internet, to communicate with the remote system 104.

Figure 9A:
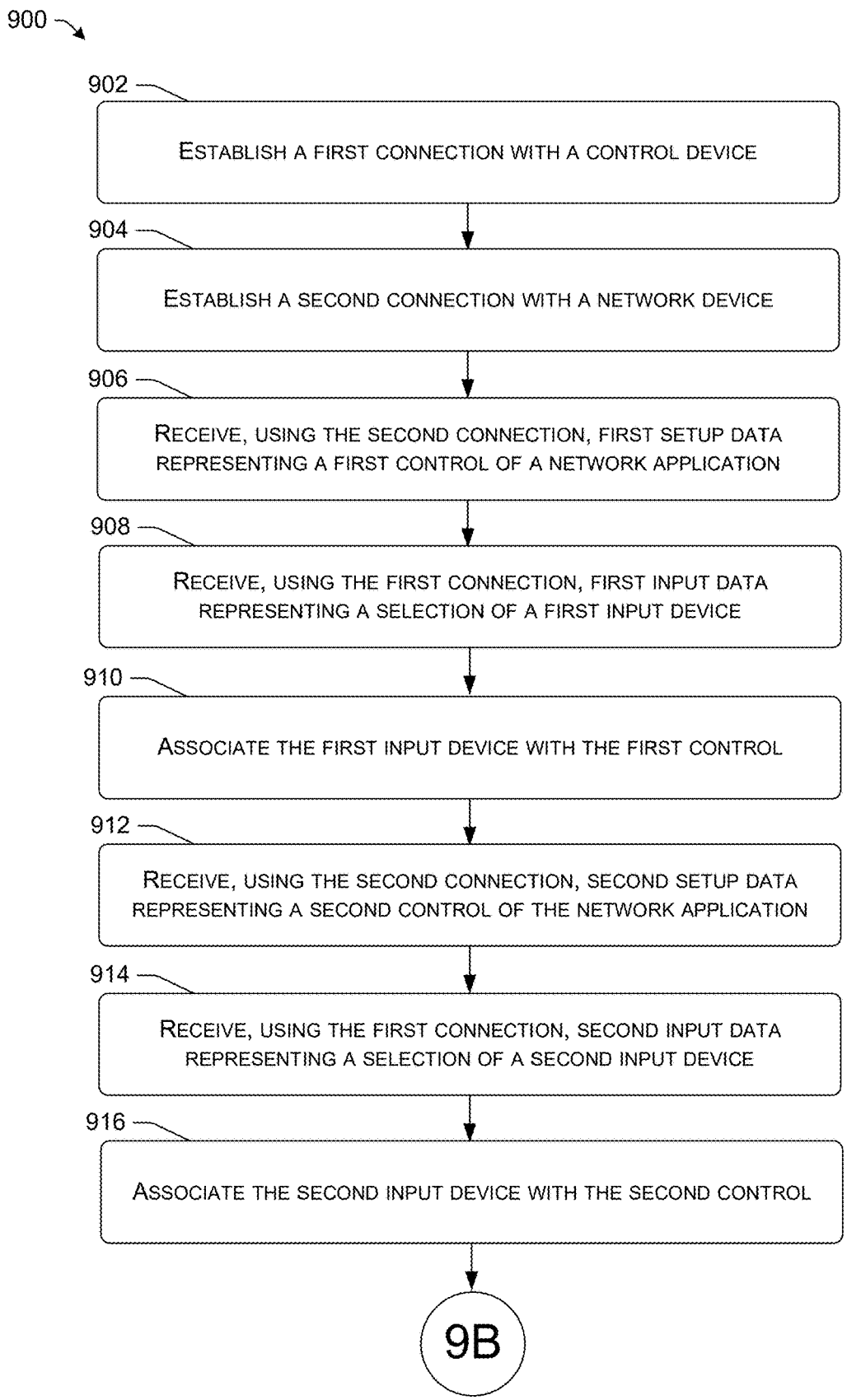
FIGS. 9A-9B illustrate an example process for configuring a control device with a network application, and then using the configuration to control the network application, according to various aspects of the present disclosure.
Figure 9B:
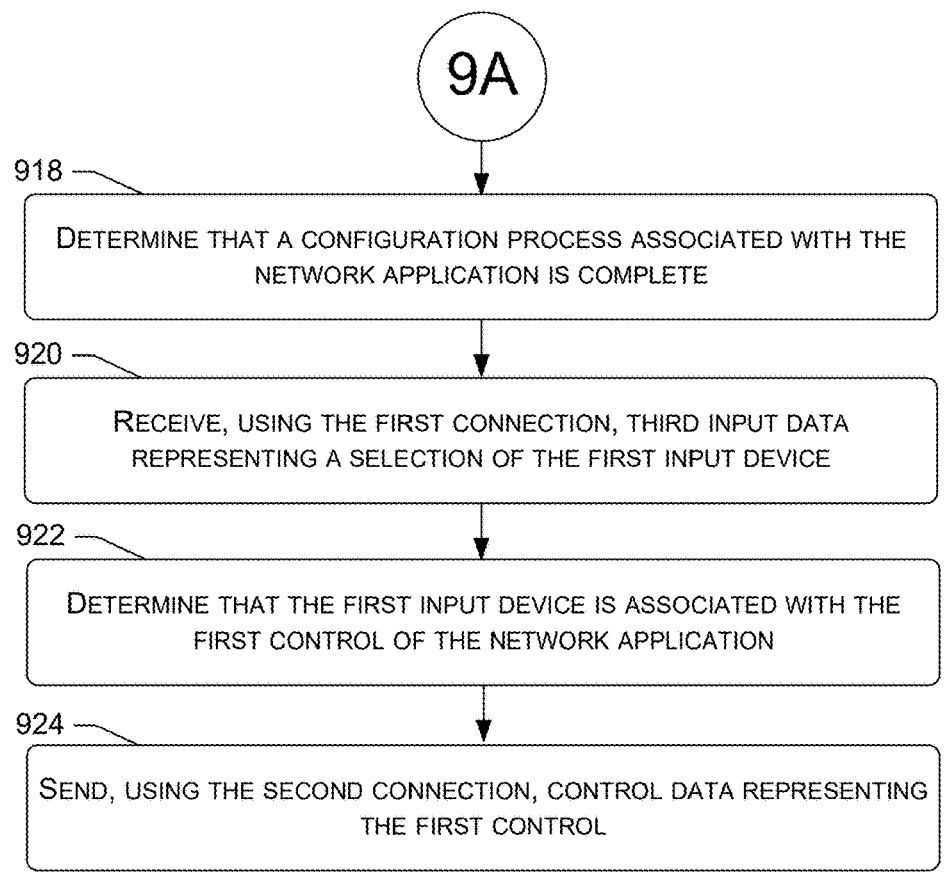
Figure 10:
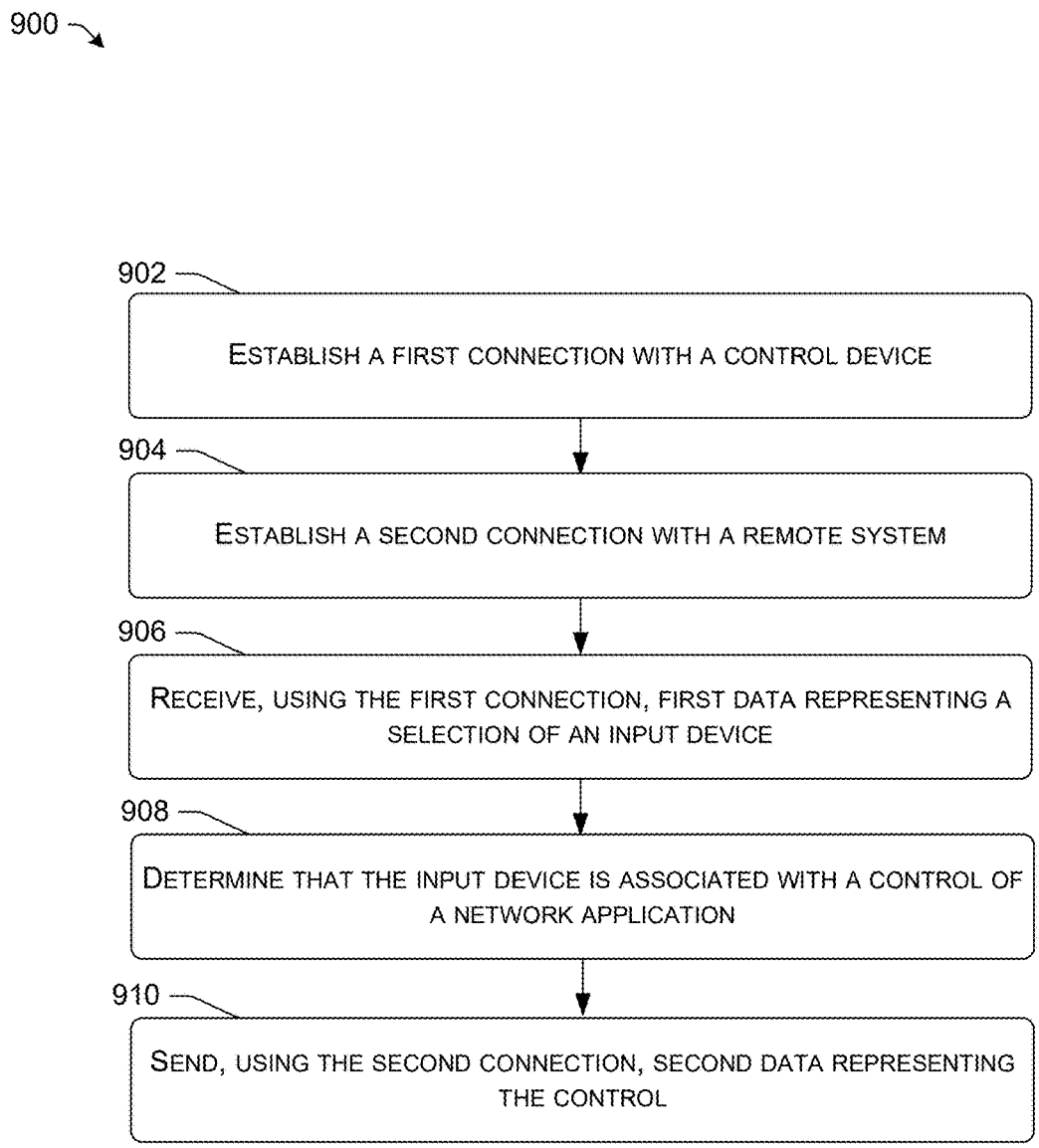
FIG. 10 illustrates an example process for using configuration data to control a network application, according to various aspects of the present disclosure.

FIGS. 9A-10 illustrate various processes for converting inputs from control devices. The processes described herein are illustrated as collections of blocks in logical flow diagrams, which represent a sequence of operations, some, or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

FIGS. 9A-9B illustrate an example process 900 for configuring a control device with a network application, and then using the configuration to control the network application, according to various aspects of the present disclosure. At 902, the process 900 may include establishing a first connection with a control device. For instance, the mobile device 138 may establish the first connection with the control device 142. In some instances, the first connection is a wired connection that the mobile device 138 establishes using a wired connector. In other instances, the first connection includes a wireless connection that the mobile device 138 establishes using a wireless network interface.

At 904, the process 900 may include establishing a second connection with a network device. For instance, the mobile device 138 may establish the second connection with the network 114. In some instances, the mobile device 138 establishes the second connection using network data associated with the network 114. In some instances, the mobile device 138 establishes the second connection based at least in part on establishing the first connection with the control device 142.

In some instances, the mobile device 138 may then determine to configure the control device 142 with a network application being executed on the remote system 104. For instance, the mobile device 138 may determine that the mobile device 138 is not storing configuration data associated with the control device 142 and/or the network application. As such, the mobile device 138 may operate in a mode in which the mobile device 138 is able to configure the control device 142 with the network application.

For instance, and at 906, the process 900 may include receiving, using the second connection, first setup data representing a first control of a network application and at 908, the process 900 may include receiving, using the first connection, first input data representing a selection of a first input device. For instance, the mobile device 138 may receive, using the first connection, the first setup data from the remote system 104. Additionally, the mobile device 138 may receive, using the second connection, the first input data from the control device 142. In some instances, the user selects the first input device to associate with the first control.

At 910, the process 900 may include associating the first input device with the first control. For instance, the mobile device 138 may generate configuration data that associates the first input device with the first control. For example, the configuration data may map the first input device to the first control. In some instances, the mobile device 138 then stores the configuration data. Additionally, or alternatively, in some instances, the mobile device 138 sends the configuration data to the remote system 104.

At 912, the process 900 may include receiving, using the second connection, second setup data representing a second control of the network application and at 914, the process 900 may include receiving, using the first connection, second input data representing a selection of a second input device. For instance, the mobile device 138 may receive, using the second connection, the second setup data from the remote system 104. Additionally, the mobile device 138 may receive, using the first connection, the second input data from the control device 142. In some instances, the user selects the second input device to associate with the second control.

At 916, the process 900 may include associating the second input device with the second control. For instance, the mobile device 138 may generate configuration data that associates the second input device with the second control. For example, the configuration data may map the second input device to the second control. In some instances, the mobile device 138 then stores the configuration data. Additionally, or alternatively, in some instances, the mobile device 138 sends the configuration data to the remote system 104. Additionally, in some instances, the mobile device 138 may continue to perform these processes in order to associate additional input devices of the control device 142 with additional controls of the network application.

At 918, the process 900 may include determining that a configuration process associated with the network application is complete. For instance, the mobile device 138 may determine that the configuration is complete. In some instances, the mobile device 138 makes the determination based at least in part on determining that all of the controls have been associated with at least one input device. In some instances, the mobile device 138 makes the determination based at least in part on receiving from the control device 142, input data indicating that the configuration process is complete. Still, in some instances, the mobile device 138 makes the determination based at least in part on receiving from the remote system 104, data indicating that the configuration process is complete.

At 920, the process 900 may include receiving, using the first connection, third input data representing a selection of the first input device. For instance, the mobile device 138 may receive, using the first connection, the third input data. The mobile device 138 may receive the third input data while the remote system 104 is executing the network application. For instance, the third input data may be for updating a state of the network application.

At 922, the process 900 may include determining that the first input device is associated with the first control of the network application and at 924, the process 900 may include sending, using the second connection, control data representing the first control. For instance, the mobile device 138 may use the configuration data to determine that the first input device is associated with the first control. The mobile device 138 may then generate the control data representing the first control. Additionally, the mobile device 138 may send, using the second connection, the control data to the remote system 104.

FIG. 10 illustrates an example process 1000 for using configuration data to control a network application, according to various aspects of the present disclosure. At 1002, the process 1000 may include establishing a first connection with a control device. For instance, the mobile device 138 may establish the first connection with the control device 106. In some instances, the first connection is a wired connection that the mobile device 138 establishes using a wired connector. In other instances, the first connection includes a wireless connection that the mobile device 138 establishes using a wireless network interface.

At 1004, the process 1000 may include establishing a second connection with a network device. For instance, the mobile device 138 may establish the second connection with the network 114. In some instances, the mobile device 138 establishes the second connection using network data associated with the network 114. In some instances, the mobile device 138 establishes the second connection based at least in part on establishing the first connection with the control device 142.

In some instances, the mobile device 138 may then receive identifier data associated with the control device 142. The mobile device 138 may then use the identifier data to identify that the first connection is with the control device 142. Additionally, in some instances, the mobile device 138 may receive data identifying a network application. The mobile device 138 may then determine if the mobile device 138 is storing configuration data associated with the control device 142 controlling the network application. Additionally, or alternatively, in some instances, the mobile device 138 may receive the configuration data, such as from the remote system 104.

At 1006, the process 1000 may include receiving, using the first connection, first data representing a selection of an input device. For instance, the mobile device 138 may receive, using the first connection, the input data. The mobile device 138 may receive the input data while the remote system 104 is executing the network application. For instance, the third input data may be for updating a state of the network application.

At 1008, the process 1000 may include determining that the input device is associated with a control of a network application and at 1010, the process 1000 may include sending, using the second connection, second data representing the control. For instance, the mobile device 138 may use the configuration data to determine that the input device is associated with the control. The mobile device 138 may then generate the second data representing the control. Additionally, the mobile device 138 may send, using the second connection, the second data to the remote system 104.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although this particular embodiments are described herein having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system comprising:
a server hosting a network game;
a gaming controller comprising at least one of a wireless connection or a wired connection; and
a mobile device comprising:
an interface for establishing a connection with the gaming controller through the wireless connection or the wired connection;
one or more network interfaces;
one or more processors; and
one or more computer-readable media storing instructions that, when executed by the one or more processors, cause the one or more processors to perform operations comprising:
establishing, using the one or more network interfaces, a second connection with the server;
receiving, using the second connection, network game information comprising an indication of a first control of the network game;
mapping the first control to a first input device of the gaming controller based at least in part on the network game information;
receiving, using the interface, first input data representing a selection of a first input device of the gaming controller;
based at least in part on receiving the first input data, associating the first input device with the first control of the network game based at least in part on mapping the first control to the first input device of the gaming controller; and
sending, using the one or more network interfaces and over the second connection, control data representing an indication that the first control was selected.

2. The system of claim 1, the operations further comprising storing an identifier associated with the gaming controller, the control data comprising the identifier.

3. The system of claim 1, further comprising a second gaming controller, the second gaming controller comprising a communication element configured to communicate with the server over a network device separate from the mobile device.

4. The system of claim 1, further comprising a second gaming controller, the second gaming controller comprising at least one of a second wireless connection or a second wired connection to communicate with the mobile device, the operations further comprising:
receiving, using the interface, second input data representing a second selection of a second input device of the second gaming controller;
based on receiving the second input data, associating the second input device with a second control of the network game; and
sending, using the one or more network interfaces and over the connection, second control data representing an indication that the second control was selected.

5. A method comprising:
establishing, using a first network interface, a first connection from a mobile device to a control device;
establishing, using a second network interface, a second connection from the mobile device to one or more computing devices hosting a network game application;
receiving, using the second connection, network game application information comprising an indication of a control of the network game application;
mapping the control to an input device of the controller based at least in part on the network game application information;
receiving, using the first connection, first data representing a selection of an input device of the control device;
determining that the input device is associated with the control of the network game application based at least in part on mapping the control to the input device of the controller; and
sending, using the second connection, second data to the one or more computing devices, the second data representing an indication that the control was selected.

6. The method as recited in claim 5, further comprising:
receiving, using the second connection, third data associated with configuring the control of the network game application;
receiving, using the first connection, fourth data representing an additional selection of the input device; and
generating fifth data that associates the input device with the control,
and wherein determining that the input device is associated with the control is based at least in part on the fifth data.

7. The method as recited in claim 6, further comprising:
receiving sixth data representing an identifier associated with the control device; and
associating the fifth data with the identifier of the control device.

8. The method as recited in claim 5, further comprising:
establishing, using a third network interface, a third connection from a second control device to one or more computing devices, the second control device configured to communicate with the one or more computing devices through a network device separate from the mobile device; and
receiving, using the third connection, third data representing a second selection of a second input device of the second control device;
determining that the input device is associated with a second control of the network game application; and
sending, using the third connection, third data to the one or more computing devices, the third data representing a second indication that a second control of the second control device was selected.

9. The method as recited in claim 5, further comprising:
receiving, using the second connection, third data that associates the input device with the control,
and wherein determining that the input device is associated with the control is based at least in part on the third data.

10. The method as recited in claim 5, further comprising:
storing third data that associates the input device with the control device;
receiving, using the first connection, fourth data representing an identifier associated with the control device; and
identifying the third data based at least in part on the identifier,
and wherein determining that the input device is associated with the control is based on the third data.

11. The method as recited in claim 5, wherein the control device is a first type of control device, and wherein the method further comprises:
establishing, using the first network interface, a third connection with an additional control device, wherein the additional control device is a second type of control device;
receiving, using the third connection, third data representing an additional selection of an additional input device of the additional control device;
determining that the additional input device is associated with the control of the network game application; and
sending, using the second connection, fourth data to the one or more computing devices, the fourth data representing an indication that the control was selected.

12. The method as recited in claim 11, wherein the mobile device comprises a smartphone, and wherein the method further comprises:
receiving a selection, via an input device of the smartphone, of the control device or the additional control device; and
controlling the network game application based at least in part on the selection.

13. The method as recited in claim 5, further comprising:
determining that an electronic device associated with the network game application is powered on; and
causing, in response to the electronic device being powered on, the control device to associate with the electronic device.

14. The method as recited in claim 5, wherein the control device comprises a third-party control device, the third-party control device not associated with control of the network game application prior to establishing the first connection.

15. A non-transitory computer-readable media storing instructions that, when executed by one or more processors, cause the one or more processors to perform operations comprising:
establishing, using a first network interface, a first connection from a mobile device to a control device;
establishing, using a second network interface, a second connection from the mobile device to one or more computing devices hosting a network game application;
receiving, using the second connection, network game application information comprising an indication of a control of the network game application;
mapping the control to an input device of the controller based at least in part on the network game application information;
receiving, using the first connection, first data representing a selection of an input device of the control device;
determining that the input device is associated with the control of the network game application based at least in part on mapping the control to the input device of the controller; and
sending, using the second connection, second data to the one or more computing devices, the second data representing an indication that the control was selected.

16. The non-transitory computer-readable media of claim 15, the operations further comprising:
establishing, using a third network interface, a third connection from a second control device to one or more computing devices, the second control device configured to communicate with the one or more computing devices through a network device separate from the mobile device; and
receiving, using the third connection, third data representing a second selection of a second input device of the second control device;
determining that the input device is associated with a second control of the network game application; and
sending, using the third connection, third data to the one or more computing devices, the third data representing a second indication that a second control of the second control device was selected.

17. The non-transitory computer-readable media of claim 15, the operations further comprising:
receiving, using the second connection, third data associated with configuring the control of the network game application;
receiving, using the first connection, fourth data representing an additional selection of the input device; and
generating fifth data that associates the input device with the control,
and wherein determining that the input device is associated with the control is based at least in part on the fifth data.

18. The non-transitory computer-readable media of claim 15, wherein the control device is a first type of control device, and wherein the operations further comprise:
establishing, using the first network interface, a third connection with an additional control device, wherein the additional control device is a second type of control device;
receiving, using the third connection, third data representing an additional selection of an additional input device of the additional control device;
determining that the additional input device is associated with the control of the network game application; and
sending, using the second connection, fourth data to the one or more computing devices, the fourth data representing an indication that the control was selected.

19. The non-transitory computer-readable media of claim 18, wherein the mobile device comprises a smartphone, the operations further comprising:
receiving a selection, via an input device of the smartphone, of the control device or the additional control device; and
controlling the network game application based at least in part on the selection.

20. The non-transitory computer-readable media of claim 15, wherein the control device comprises a third-party control device, the third-party control device not associated with control of the network game application prior to establishing the first connection.

\* \* \* \* \*